(12) United States Patent
Kanematsu et al.

(10) Patent No.: US 11,023,189 B2
(45) Date of Patent: Jun. 1, 2021

(54) IMAGE PROCESSING APPARATUS, CONTROL METHOD FOR IMAGE PROCESSING APPARATUS, AND STORAGE MEDIUM

(71) Applicant: CANON KABUSHIKI KAISHA, Tokyo (JP)

(72) Inventors: Shinichi Kanematsu, Abiko (JP); Keisuke Aizono, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/270,427

(22) Filed: Feb. 7, 2019

(65) Prior Publication Data

US 2019/0171400 A1 Jun. 6, 2019

Related U.S. Application Data

(63) Continuation of application No. 15/231,284, filed on Aug. 8, 2016, now Pat. No. 10,228,889.

(30) Foreign Application Priority Data

Aug. 19, 2015 (JP) ................. 2015-161994
Apr. 28, 2016 (JP) ................. 2016-091603

(51) Int. Cl.
*G06F 3/12* (2006.01)
*H04N 1/44* (2006.01)
(Continued)

(52) U.S. Cl.
CPC .......... *G06F 3/1263* (2013.01); *G06F 3/1222* (2013.01); *G06F 3/1238* (2013.01);
(Continued)

(58) Field of Classification Search
USPC .......... 358/1.1–3.29, 1.11–1.18; 399/10, 11, 399/16–19, 80–87
See application file for complete search history.

(56) References Cited

U.S. PATENT DOCUMENTS 6,667,810 B1 * 12/2003 Jeyachandran ....... G06F 3/1204
358/1.14
8,736,866 B2 * 5/2014 Uchikawa .......... H04N 1/00915
358/1.14
(Continued)

FOREIGN PATENT DOCUMENTS

JP 2008-263397 A 10/2008
JP 2009-098953 A 5/2009
(Continued)

*Primary Examiner* — Marcellus J Augustin
(74) *Attorney, Agent, or Firm* — Canon U.S.A., Inc. IP Division

(57) ABSTRACT

An image processing apparatus that performs print processing based on a job includes a reception unit configured to receive an operation performed by a user, a change unit configured to, in response to the reception unit receiving a predetermined operation, change a job on which the print processing is not yet completed to a suspended state, and a job control unit configured to, when detecting a logout event that causes a user who is logged into the image processing apparatus to log out of the image processing apparatus, resume at least one job and cancel a job or jobs that are not resumed by the job control unit selected from jobs changed by the change unit to be in the suspended state.

15 Claims, 19 Drawing Sheets

(51) Int. Cl.
*H04N 1/00* (2006.01)
*H04N 1/32* (2006.01)

(52) U.S. Cl.
CPC .......... *G06F 3/1267* (2013.01); *G06F 3/1274* (2013.01); *H04N 1/00411* (2013.01); *H04N 1/00477* (2013.01); *H04N 1/00915* (2013.01); *H04N 1/32106* (2013.01); *H04N 1/4413* (2013.01); *H04N 1/4433* (2013.01); *H04N 2201/0094* (2013.01); *H04N 2201/3204* (2013.01); *H04N 2201/3215* (2013.01); *H04N 2201/3219* (2013.01); *H04N 2201/3221* (2013.01); *H04N 2201/3223* (2013.01)

(56) References Cited

U.S. PATENT DOCUMENTS

| | | | | |
|---|---|---|---|---|
| 2008/0144071 | A1* | 6/2008 | Uchikawa | H04N 1/00915 358/1.14 |
| 2009/0027722 | A1* | 1/2009 | Tsujimoto | G06F 3/1285 358/1.15 |
| 2009/0290190 | A1* | 11/2009 | Torii | G06F 3/1222 358/1.15 |
| 2014/0139863 | A1* | 5/2014 | Harada | H04N 1/00339 358/1.14 |

FOREIGN PATENT DOCUMENTS

| | | |
|---|---|---|
| JP | 2013-031101 A | 2/2013 |
| JP | 2013-045333 A | 3/2013 |
| JP | 2017-41870 A | 2/2017 |

* cited by examiner

| USER ID | PASSWORD | CARD ID | ROLE |
|---|---|---|---|
| Admin | ********* | 0x****7001 | Administrator |
| UserA | ********* | 0x****90FD | GeneralUser |
| UserB | ********* | 0x****AA49 | GeneralUser |
| UserC | ********* | 0x****84B2 | GeneralUser |
| UserD | ********* | 0x****A12F | GeneralUser |
| ⋮ | ⋮ | ⋮ | ⋮ |

FIG.8A

| TASK ID 801 | TIME 802 | TASK GENERATION SOURCE 803 | JOB NAME 804 | JOB OWNER NAME 805 | STATUS 806 |
|---|---|---|---|---|---|
| 0807 | 09:25 | COPY JOB | COPY | UserB | PRINTING IN PROGRESS — 811 |
| 0808 | 09:26 | COPY JOB | COPY | UserA | WAITING FOR PRINTING — 812 |
| 0809 | 09:30 | COPY JOB | COPY | UserA | WAITING FOR PRINTING |
| 1101 | 09:31 | NORMAL PRINT JOB | EXPLANATORY MATERIAL.doc | UserD | WAITING FOR PRINTING |

FIG.8B

| TASK ID 801 | TIME 802 | TASK GENERATION SOURCE 803 | JOB NAME 804 | JOB OWNER NAME 805 | STATUS 806 |
|---|---|---|---|---|---|
| 0807 | 09:25 | COPY JOB | COPY | UserB | SUSPENDED |
| 0808 | 09:26 | COPY JOB | COPY | UserA | SUSPENDED |
| 0809 | 09:30 | COPY JOB | COPY | UserA | SUSPENDED |
| 1101 | 09:31 | NORMAL PRINT JOB | EXPLANATORY MATERIAL.doc | UserD | WAITING FOR PRINTING |
| 1102 | 09:34 | NORMAL PRINT JOB | MINUTES 0630.txt | UserC | WAITING FOR PRINTING — 814 |

FIG.10

COPY SETTING  (ID Admin LOGGING IN)

<PROCESSING OF JOBS THAT ARE SUSPENDED DURING LOGOUT>

- ⦿ CANCEL ALL OF THE JOBS ~1001
- ○ RESUME ALL OF THE JOBS ~1002
- ○ REMAIN JOB OF USER WHO LOGS OUT IN ERROR STATE, AND RESUME JOB OF ANOTHER USER ~1003
- ○ CANCEL JOB OF USER WHO LOGS OUT, AND RESUME JOB OF ANOTHER USER ~1004

1012 × CANCEL SETTINGS     1011 OK

JOB STATUS CONFIRMATION     LOGOUT

FIG.16

DATA INCLUDED IN TASK OF PRINT PROCESSING
- TASK ID = 0808 — 701
- INPUT DATE AND TIME = 2015/06/30 09:26 — 702
- TASK GENERATION SOURCE = COPY — 703
- JOB NAME = "COPY" — 704
- JOB OWNER NAME = "UserA" — 705
- SESSION ID = 0002 — 1601
- STATUS = WAITING FOR PRINTING — 706
- PRINT DATA, PRINT SETTING — 707

FIG. 17A DURING SUSPENDED STATE

| TASK ID (801) | TIME (802) | TASK GENERATION SOURCE (803) | JOB NAME (804) | JOB OWNER NAME (805) | SESSION ID (1701) | STATUS (806) |
|---|---|---|---|---|---|---|
| 0807 | 09:25 | COPY JOB | COPY | UserB | 0001 | SUSPENDED |
| 0808 | 09:26 | COPY JOB | COPY | UserA | 0002 | SUSPENDED |
| 0809 | 09:30 | COPY JOB | COPY | UserA | 0003 | SUSPENDED |
| 1101 | 09:31 | NORMAL PRINT JOB | EXPLANATORY MATERIAL.doc | UserD | — | WAITING FOR PRINTING |
| 1102 | 09:34 | NORMAL PRINT JOB | MINUTES 0630.txt | UserC | — | WAITING FOR PRINTING |
| 0810 | 09:38 | COPY JOB | COPY | UserA | 0003 | SUSPENDED |

1711, 1712, 1713

FIG. 17B LOGOUT DURING SUSPENDED STATE (MODE 1)

| TASK ID (801) | TIME (802) | TASK GENERATION SOURCE (803) | JOB NAME (804) | JOB OWNER NAME (805) | SESSION ID (1701) | STATUS (806) |
|---|---|---|---|---|---|---|
| 0807 | 09:25 | COPY JOB | COPY | UserB | 0001 | WAITING FOR PRINTING |
| 0808 | 09:26 | COPY JOB | COPY | UserA | 0002 | WAITING FOR PRINTING |
| 0809 | 09:30 | COPY JOB | COPY | UserA | 0003 | CANCEL |
| 1101 | 09:31 | NORMAL PRINT JOB | EXPLANATORY MATERIAL.doc | UserD | — | WAITING FOR PRINTING |
| 1102 | 09:34 | NORMAL PRINT JOB | MINUTES 0630.txt | UserC | — | WAITING FOR PRINTING |
| 0810 | 09:38 | COPY JOB | COPY | UserA | 0003 | CANCEL |

1711, 1712, 1713

FIG. 17C LOGOUT DURING SUSPENDED STATE (MODE 2)

| TASK ID (801) | TIME (802) | TASK GENERATION SOURCE (803) | JOB NAME (804) | JOB OWNER NAME (805) | SESSION ID (1701) | STATUS (806) |
|---|---|---|---|---|---|---|
| 0807 | 09:25 | COPY JOB | COPY | UserB | 0001 | WAITING FOR PRINTING |
| 0808 | 09:26 | COPY JOB | COPY | UserA | 0002 | WAITING FOR PRINTING |
| 0809 | 09:30 | COPY JOB | COPY | UserA | 0003 | WAITING FOR PRINTING |
| 1101 | 09:31 | NORMAL PRINT JOB | EXPLANATORY MATERIAL.doc | UserD | — | WAITING FOR PRINTING |
| 1102 | 09:34 | NORMAL PRINT JOB | MINUTES 0630.txt | UserC | — | WAITING FOR PRINTING |
| 0810 | 09:38 | COPY JOB | COPY | UserA | 0003 | CANCEL |

1711, 1712, 1713

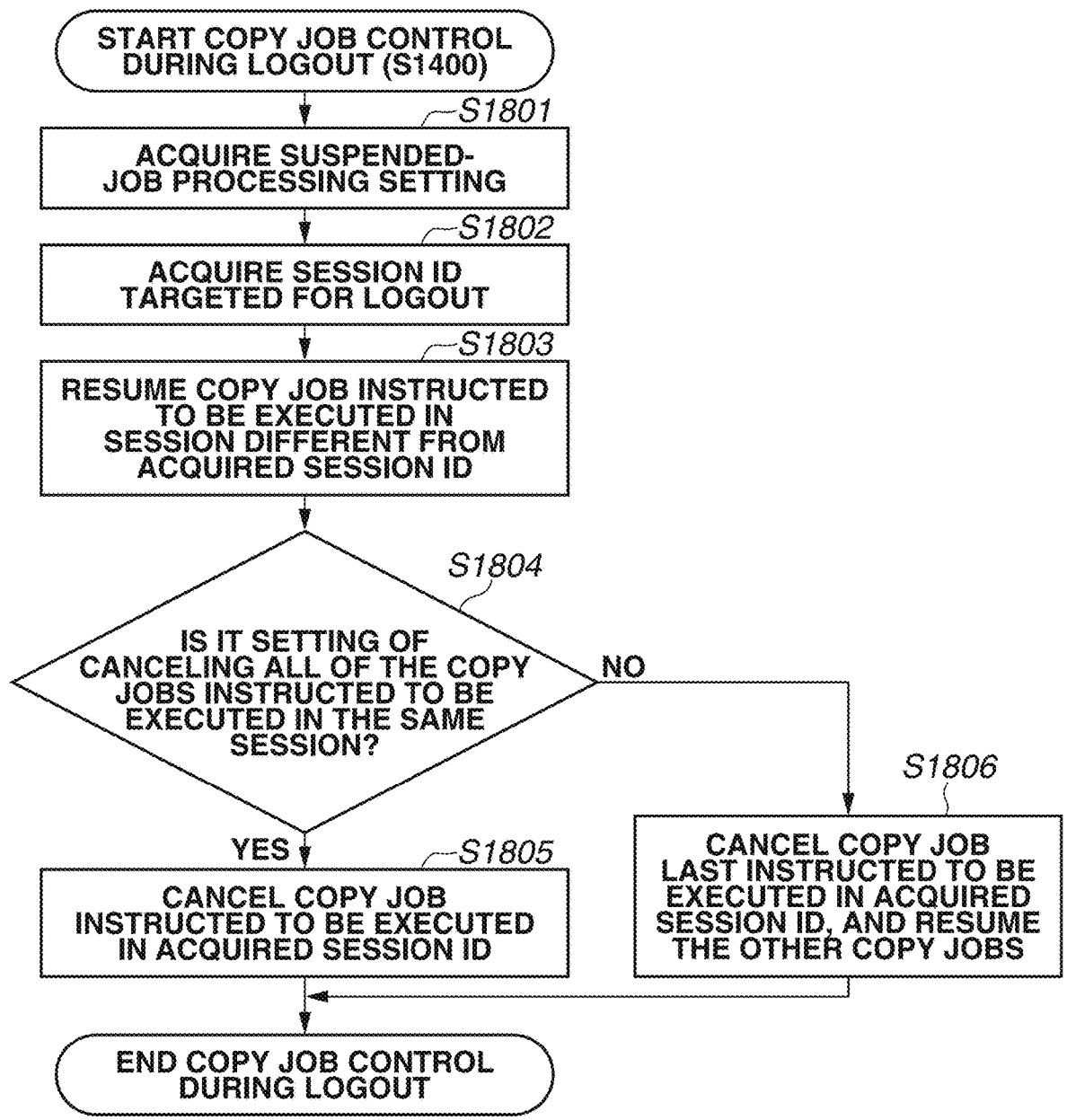

IMAGE PROCESSING APPARATUS, CONTROL METHOD FOR IMAGE PROCESSING APPARATUS, AND STORAGE MEDIUM

CROSS REFERENCE TO RELATED APPLICATIONS

This application is a continuation application of U.S. patent application Ser. No. 15/231,284 filed on Aug. 8, 2016 which claims the benefit of Japanese Patent Applications No. 2015-161994 filed Aug. 19, 2015 and No. 2016-091603 filed Apr. 28, 2016, all which are hereby incorporated by reference herein in their entirety.

BACKGROUND OF THE INVENTION

Field of the Invention

Aspects of the present invention generally relate to an image processing apparatus having a user authentication function.

Description of the Related Art

To improve security in image processing apparatuses, a conventional image processing apparatus requests a user who uses the image processing apparatus to enter a user identifier (ID) and a password and permits the user to log in to the image processing apparatus based on the entered user ID and password. When the user's login is permitted in such an image processing apparatus, the image processing apparatus enters a state in which the user is allowed to use a function, such as copying, that the image processing apparatus has.

Furthermore, in such a known image processing apparatus, when the user logs out of the image processing apparatus after completion of the use thereof, the image processing apparatus enters a state in which the user is not allowed to use each function that the image processing apparatus has, and also enters a state in which another user is allowed to log in to the image processing apparatus. Moreover, when a condition in which no operation is performed by any user on the image processing apparatus continues over a specified period, the image processing apparatus enters a state in which the user is caused to log out of the image processing apparatus and another user is allowed to log in to the image processing apparatus (automatic logout function). Additionally, in a known information processing apparatus (for example, a personal computer (PC)) having a login authentication function, when the user logs out, execution of a job which the user is performing is canceled.

Furthermore, some known conventional image processing apparatuses are configured to allow a plurality of jobs (for example, copy jobs) to be input thereto. Such an image processing apparatus executes the input jobs in turns based on the order of inputting of the jobs or the order of priority set for the jobs. Moreover, when, after a job is input, the job is to be canceled, a stop key provided in an operation unit of the image processing apparatus can be used to suspend execution of input jobs, as discussed in, for example, Japanese Patent Application Laid-Open No. 2001-251454.

The image processing apparatus discussed in Japanese Patent Application Laid-Open No. 2001-251454 allows the user to select a job to be canceled from among the suspended jobs, cancels execution of the selected job, and resumes the remaining jobs. This processing suspends all of the jobs and, therefore, prevents, while an operation to select a job to be canceled is being performed, the job from continuing being processed to generate a wasteful output object.

An image processing apparatus which performs authentication management premised on the user's login may also be configured to be able to suspend jobs with a stop key provided in an operation unit. However, the image processing apparatus discussed in Japanese Patent Application Laid-Open No. 2001-251454 is configured without consideration of a processing operation to be performed when the user logs out.

For example, the user, when becoming aware that the output operation of the image processing apparatus has been suspended by the stop key being pressed, may misunderstand that a job intended to be canceled has been indeed canceled. In this case, the user may directly perform a logout operation to log out without checking a suspension screen displayed on the operation unit. In that case, while the job is suspended, the image processing apparatus is switched to a state in which the user is not logging in. In the state in which the user is not logging in, a screen used to receive the user's login is displayed, so that each function of the image processing apparatus cannot be used.

Moreover, in a case where a user who intends to cancel a job has pressed the stop key, the user, when becoming aware that the output operation has been suspended, may misunderstand that a copy job to be canceled has been indeed canceled, and may leave the image processing apparatus without performing any operation. In this case, if the user is caused to log out by the automatic logout function, the image processing apparatus would be switched to a state in which no user is logging in.

If a logout is performed with a job suspended, the job would remain in a suspended state. Moreover, if a state in which a job remains suspended by the stop key continues, even a job different from the job that the user intends to cancel would remain suspended. In addition, a hardware resource used for a printing unit or the like to perform outputting may continue being occupied by output processing performed based on a job that is in a suspended state and is waiting for a resumption instruction. In this case, even if it is tried to perform print processing based on a print job generated from new print data received from an external device, print processing performed based on a job that is in a suspended state and is occupying a hardware resource for the printing unit or the like cannot be overtaken, so that the image processing apparatus may stop in a waiting state.

SUMMARY OF THE INVENTION

Aspects of the present invention are generally directed to providing a scheme of performing control, when a user logs out of an image processing apparatus while a job including print processing remains suspended by a user operation, to prevent the job from remaining suspended.

According to an aspect of the present invention, an image processing apparatus that performs print processing based on a job includes a reception unit configured to receive an operation performed by a user, a change unit configured to, in response to the reception unit receiving a predetermined operation, change a job on which the print processing is not yet completed to a suspended state, and a job control unit configured to, when detecting a logout event that causes a user who is logged into the image processing apparatus to log out of the image processing apparatus, resume at least one job and cancel a job or jobs that are not resumed by the job control unit selected from jobs changed by the change unit to be in the suspended state.

Further features of the present invention will become apparent from the following description of exemplary embodiments with reference to the attached drawings.

BRIEF DESCRIPTION OF THE DRAWINGS

FIGS. 8A and 8B illustrate task management for print processing.

FIG. 10 illustrates an example of a setting screen displayed on the panel of the operation unit.

FIG. 16 illustrates data included in a print processing task according to the second exemplary embodiment.

FIGS. 17A, 17B, and 17C illustrate control for a copy job performed during logout according to the second exemplary embodiment.

FIG. 18 is a flowchart illustrating control for a copy job performed during logout according to the second exemplary embodiment.

DESCRIPTION OF THE EMBODIMENTS

Various exemplary embodiments, features, and aspects of the invention will be described in detail below with reference to the drawings. Furthermore, the following exemplary embodiments are not intended to limit the invention set forth in the claims, and not all of the characteristics described in the exemplary embodiments are necessarily essential for solutions for the invention.

First, a first exemplary embodiment of the present invention is described. In the first exemplary embodiment, execution of copying instruction is received in response to an operation performed by the user. In response to receipt of execution of copying instruction, a copy job is generated, and read processing for reading an original is performed by a reading unit. Upon completion of reading of the original, print processing for printing the image data representing the read original is performed. Upon completion of the print processing, the copy job is ended.

Furthermore, when a stop key is pressed during execution of the copy job, the copy job is suspended. Accordingly, the read processing or the print processing performed based on the copy job enters a suspended state.

When the user logging out is detected while the copy job is in the suspended state in the above-described way, the copy job is controlled in such a way as to prevent the copy job from remaining suspended.

Figure 1:
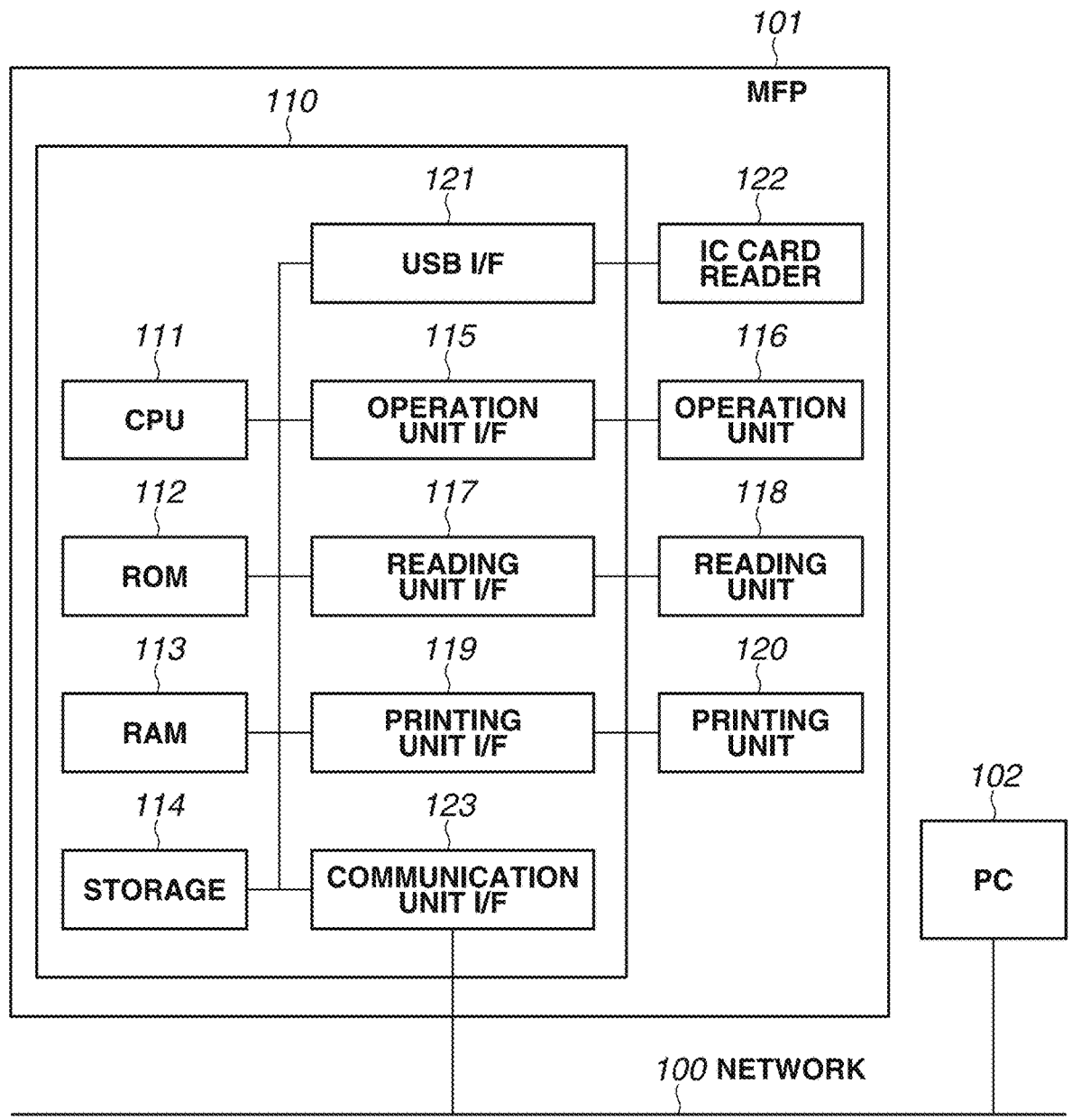
FIG. 1 is a block diagram illustrating an image processing system according to a first exemplary embodiment.

FIG. 1 is a block diagram illustrating an image processing system according to the present exemplary embodiment. In the present exemplary embodiment, a multifunction peripheral (MFP) 101 is described as an example of an image processing apparatus, and a personal computer (PC) 102 is described as an example of an information processing apparatus. The MFP 101 and the PC 102 are interconnected via a network 100 in such a way as to be able to communicate with each other.

Furthermore, although, in FIG. 1, a case where a single information processing apparatus is provided in the image processing system is illustrated as an example, the MFP 101 and a plurality of information processing apparatuses can be interconnected via the network 100 in such a way as to be able to communicate with one another. Moreover, although, in the present exemplary embodiment, a case where the image processing system includes the MFP 101 and the PC 102 is illustrated as an example, this is not limiting. For example, the MFP 101 alone can be referred to as an image processing system.

First, the PC 102 is described. The PC 102 is able to execute various programs, such as application programs. Moreover, the PC 102 has a printer driver installed thereon for sending print data to a printer. A user who intends to perform printing can issue a printing instruction via various applications. The printer driver can convert data output from an application based on the printing instruction into a page description language (PDL) that is may be interpreted by the MFP 101 and send the PDL to the MFP 101.

Next, the MFP 101 is described. The MFP 101 has a reading function, which reads an image on a sheet, and a print function, which prints an image on a sheet. Additionally, the MFP 101 has other functions, such as a file transmission function for transmitting image data to an external device.

Furthermore, although, in the present exemplary embodiment, the MFP 101 is described as an example of an image processing apparatus, this is not limiting. For example, a printing apparatus, such as a printer, having no reading function can be employed. Moreover, an image reading apparatus, such as a scanner, having no print function can also be employed. In the present exemplary embodiment, a printing apparatus including the following various constituent elements is employed by way of example.

A control unit 110, which includes a central processing unit (CPU) 111, controls an operation of the entire MFP 101. The CPU 111 reads out control programs stored in a read-only memory (ROM) 112 or a storage 114 and performs various control operations, such as reading control and printing control. The ROM 112 stores control programs, which are executable by the CPU 111. A random access memory (RAM) 113, which is a main storage memory for the CPU 111, is used as a work area or a temporary storage region onto which to load the control programs stored in the ROM 112 and the storage 114. The storage 114 stores, for example, print data, image data, various programs, and various pieces of setting information. Although, in the present exemplary embodiment, an auxiliary storage device, such as a hard disk drive (HDD), is supposed to be used as the storage 114, a non-volatile memory, such as a solid state drive (SSD), can be used instead of the HDD.

Furthermore, although, in the MFP 101 according to the present exemplary embodiment, a single CPU 111 performs each processing illustrated in the flowcharts described below using a single memory (RAM 113), another configuration can be used. For example, a plurality of CPUs, RAMs, ROMs, and storages can cooperate to perform each processing illustrated in the flowcharts described below. Moreover, a hardware circuit, such as application specific integrated circuits (ASIC) or Field Programmable Gate Array (FPGA), can be used to perform a part of processing operations.

An operation unit interface (I/F) 115 connects an operation unit 116 and the control unit 110. A universal serial bus (USB) I/F 121 connects a peripheral device and the control unit 110. In the case of FIG. 1, an integrated circuit (IC) card reader 122 is connected to the USB I/F 121. The IC card reader 122 is able to read an IC card and acquire information stored in the card.

Figure 2:
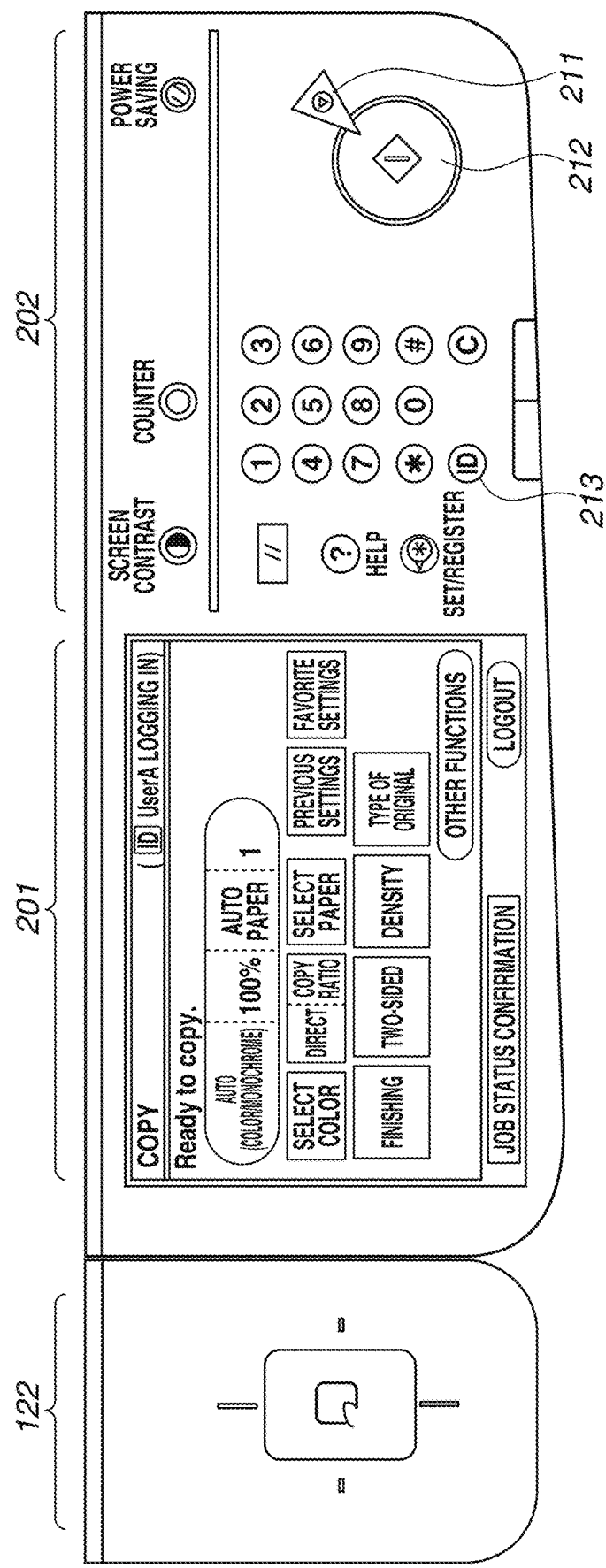
FIG. 2 is an external view illustrating an operation unit and a card reader.

FIG. 2 is an external view illustrating the operation unit 116 and the IC card reader 122. The operation unit 116 includes a panel 201, which displays an operation screen, which is described below, and a hardware key input unit 202. The panel 201 is, for example, a touch panel display. The hardware key input unit 202 includes various hardware keys, such as a stop key 211, a start key 212, and an ID key 213. The user can touch a key displayed on the panel 201 or press various hardware keys on the hardware key input unit 202 to input an instruction. The operation unit 116 functions as a reception unit that receives an instruction issued from the user via the panel 201 or the input unit 202, or functions as a display that displays an operation screen on the panel 201 as appropriate. Moreover, the stop key 211 is a key used to issue a stop instruction for a copy job. Additionally, although, in the present exemplary embodiment, a case where the stop key 211 is configured as a hardware key is illustrated by way of example, this is not limiting. For example, the stop key 211 can be a software key displayed on the panel 201.

Furthermore, the IC card reader 122 is a card reader that is used when card authentication is performed in login authentication, which is described below. When the user touches the card reader 122 with the IC card (moves the IC card closer to the card reader 122), the card reader 122 can acquire information from the IC card.

Referring back to FIG. 1, a reading unit I/F 117 connects a reading unit 118 and the control unit 110. The reading unit 118 reads an image on a sheet to generate image data. The image data generated by the reading unit 118 is transmitted to an external device or is printed on a sheet. Moreover, the reading unit 118 is able to read a plurality of sheets of an original by performing a flowing-original reading operation with respect to sheets placed on a document feeder (not illustrated).

A printing unit I/F 119 connects a printing unit 120 and the control unit 110. Image data to be printed is transferred from the control unit 110 to the printing unit 120 via the printing unit I/F 119. The printing unit 120 receives a control command and image data, which is to be printed, via the control unit 110, and prints an image formed based on the image data on a sheet. The printing method used by the printing unit 120 can be an electrophotographic method or an ink-jet method. Another method (for example, a thermal transfer method) can be used as long as it is a method capable of printing an image on a sheet.

Furthermore, the control unit 110 is connected to the network 100 via a communication unit I/F 123. The communication unit I/F 123 transmits image data and information to an external device on the network 100 or receives print data and information from an information processing apparatus on the network 100.

The print data received via the communication unit I/F 123 is analyzed by a software module (a PDL analysis unit, not illustrated), which is used to analyze print data stored in the storage 114 or the ROM 112. The PDL analysis unit generates a print job (details thereof being described below), which is used for printing by the printing unit 120, based on print data expressed by various types of page description languages (PDLs).

<Login Authentication Function>

Next, a login authentication function included in the MFP 101 according to the present exemplary embodiment is described. The MFP 101 provides a user, who is permitted to log in by login authentication, with various functions, such as copying, included in the MFP 101. The user uses various functions of the MFP 101 via the operation unit 116 of the MFP 101.

Figure 3:
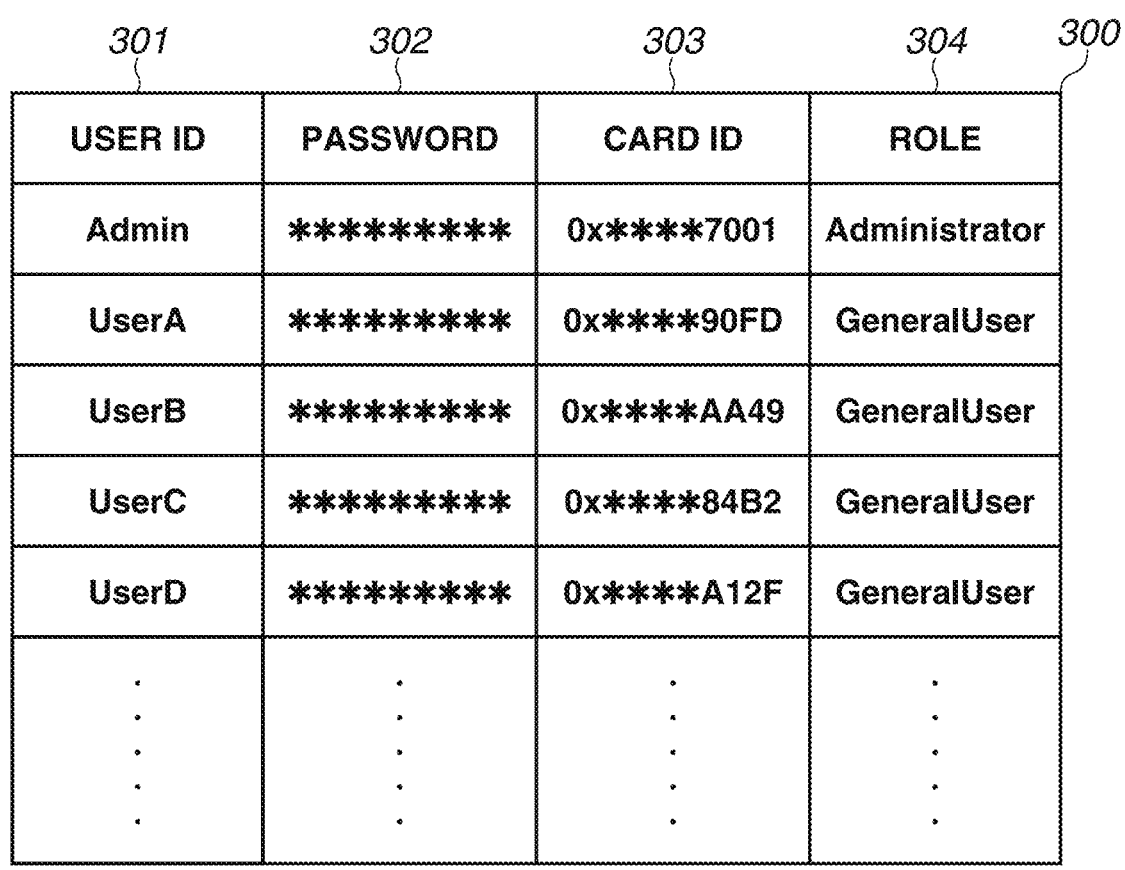
FIG. 3 illustrates user data.

FIG. 3 illustrates an example of user data stored in the storage 114 of the MFP 101. User information 300, which is information for managing users to be allowed to log in to the MFP 101, includes, for example, a user ID 301, a password 302, a card ID 303, and a role 304. Besides, the user information 300 can further include other management data, such as the expiration date of a password and an e-mail address.

The user ID 301 is a user ID uniquely indicating a user. Moreover, the password 302 is a password used to authenticate a user. The card ID 303 is a key used to identify a specified user from among a plurality of pieces of user information 300. Additionally, the card ID 303 is authentication information associated with an IC card possessed by the user of the MFP 101.

The role 304 is information indicating the authority of a user. In the case of FIG. 3, examples of the role 304 include two types, i.e., "Administrator", which indicates a user having an authority to manage the MFP 101, and "GeneralUser", which indicates a general user of the MFP 101. For example, a user with a role of "Administrator" is allowed to perform, for example, management setting of the MFP 101. Hereinafter, a user with a role of "Administrator" is referred to as an "administrator".

The user of the MFP 101 is allowed to log in to the MFP 101 using one of card authentication and keyboard authentication.

Figure 4A:
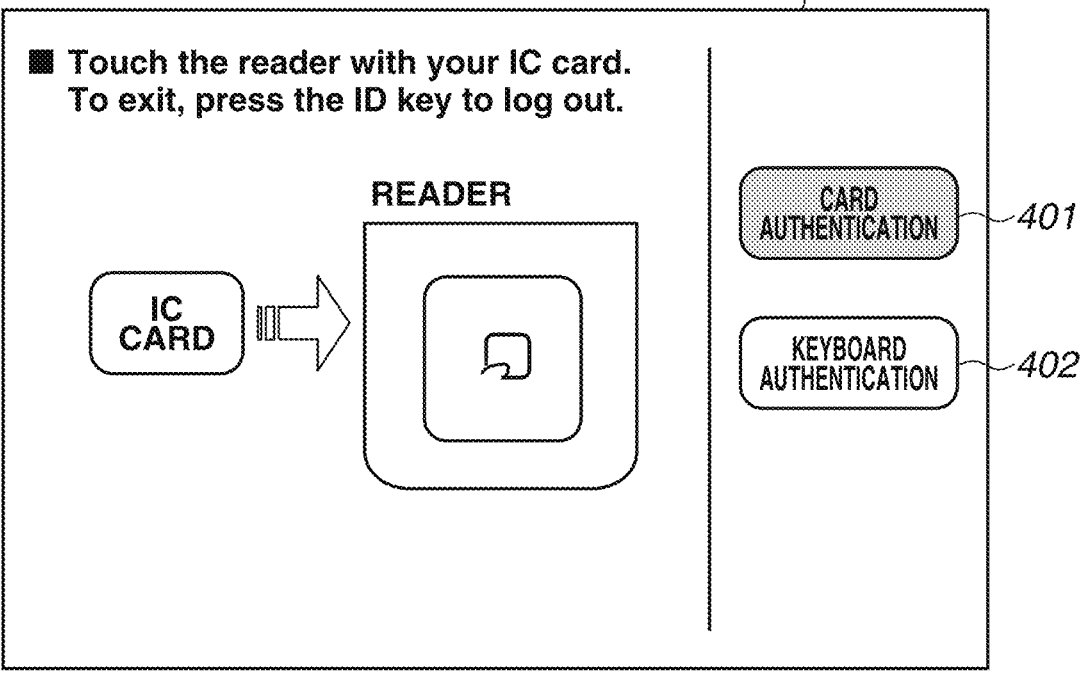
FIGS. 4A and 4B illustrate examples of login screens displayed on the panel of an operation unit.

FIG. 4A illustrates an example of a screen used to receive a user's login (hereinafter, referred to as a "login screen"), which is displayed on the panel 201 of the operation unit 116. A card authentication screen 410 illustrated in FIG. 4A, which is a screen displayed in the case of receiving a login with an IC card held, indicates an example in which a card authentication key 401 has been selected. The card authentication key 401 illustrated in FIG. 4A is a key used to display a screen required to perform card authentication. The user is able to log in with an IC card by moving the IC card closer to the card reader 122.

The CPU 111 acquires information from the IC card held near the card reader 122. Additionally, the CPU 111 is able to authenticate the user by performing verification between the information acquired from the card reader 122 and the card ID 303 of the user data stored in the storage 114.

Figure 4B:
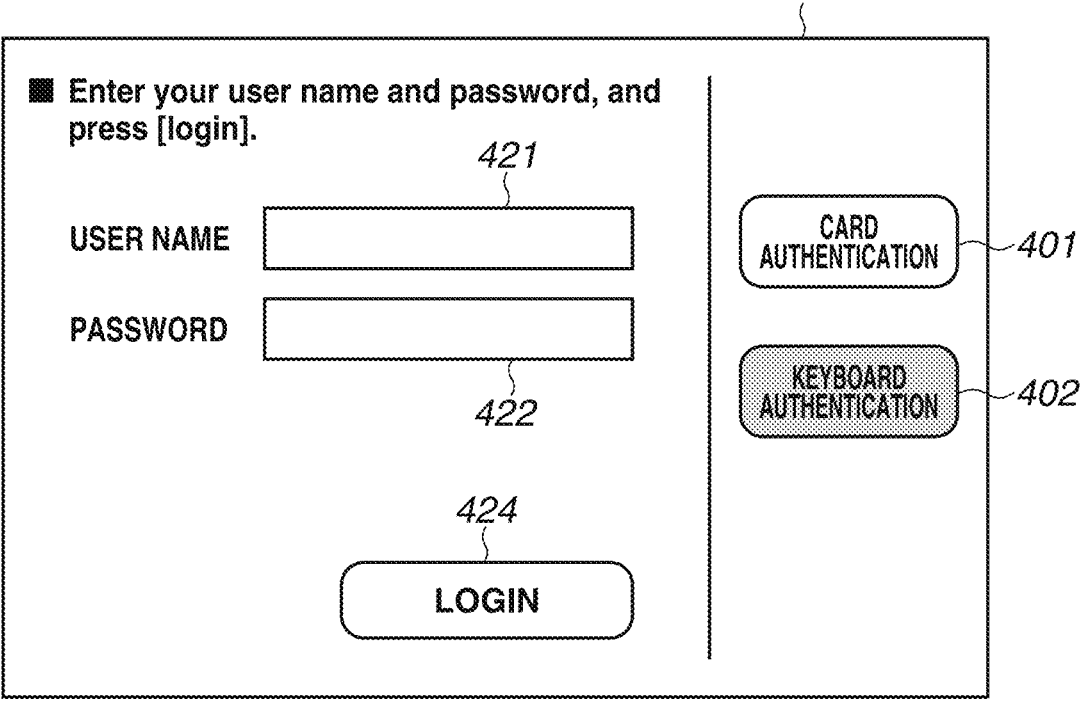

Furthermore, a keyboard authentication key 402 illustrated in FIG. 4A is a key used to display a screen required to perform keyboard authentication. When the keyboard authentication key 402 is pressed, the CPU 111 switches the screen displayed on the panel 201 to a keyboard authentication screen 420. FIG. 4B illustrates an example of the keyboard authentication screen 420.

The user can log in to the MFP 101 by entering the user's user ID and password while the keyboard authentication screen 420 is displayed. A field 421 is used to enter a user ID, and a field 422 is used to enter a password. Moreover, a login key 424 is an operation key used to start login processing.

When the login key 424 is pressed, the CPU 111 performs verification between authentication information input to the fields 421 and 422 and authentication information stored as the user data, and then determines whether to permit the user to log in.

Furthermore, although, in the present exemplary embodiment, a case where whether to permit the user to log in is determined using the user data stored in the storage 114 of the MFP 101 is described by way of example, this is not limiting. For example, a method of connecting to an external authentication server via the communication unit I/F 123 and using a result of authentication provided by the external authentication server can be employed. In this case, exchange of authentication information with the external authentication server is performed using a known technique, such as the Lightweight Directory Access Protocol (LDAP).

Figure 5:
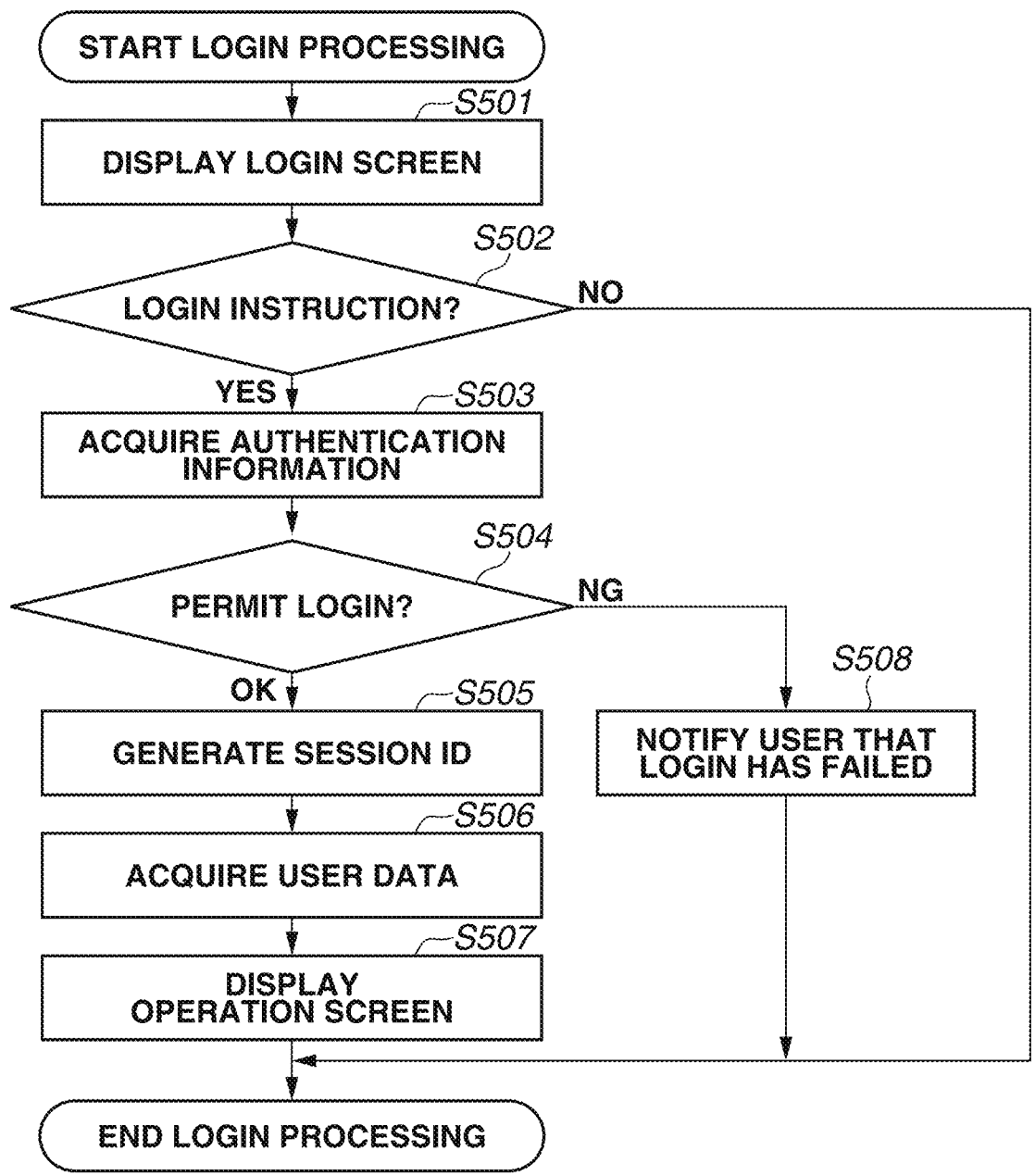
FIG. 5 is a flowchart illustrating control for login authentication.

Specific control over login authentication is described with reference to the flowchart of FIG. 5. Each operation (step) in a flowchart illustrated in FIG. 5 is implemented by the CPU 111 reading a control program stored in the ROM 112 or the storage 114 onto the RAM 113 and executing the control program. The MFP 101 executes the flowchart of FIG. 5 when detecting an event in which the user starts an operation on the MFP 101, which is in a logout state. More specifically, when the MFP 101 is operated in a case where no user is logging in to the MFP 101, the CPU 111 performs control corresponding to the flowchart of FIG. 5.

In step S501, the CPU 111 displays the card authentication screen 410 on the panel 201. Then, the CPU 111 receives user's inputs (for example, switching to the keyboard authentication screen 420 and inputs of authentication information via the fields 421 and 422) via the operation unit 116 as appropriate.

In step S502, the CPU 111 determines whether a login instruction has been issued. More specifically, when the login key 424 or the ID key 213 is pressed after the authentication information (a user ID and a password) is received via the keyboard authentication screen 420 in step S501, the CPU 111 determines that the login instruction has been issued (YES in step S502). Moreover, when the card reader 122 has detected the IC card via an external I/F under the condition that the screen 410 is displayed, the CPU 111 also determines that the login instruction has been issued (YES in step S502), and the processing then proceeds to step S503. On the other hand, in a case where any of the login key 424 and the ID key 213 is not pressed or in a case where no IC card is detected by the card reader 122, the CPU 111 determines that a login instruction has not been issued (NO in step S502), and then ends the login processing without performing authentication.

In step S503, the CPU 111 acquires the authentication information. In a case where a login instruction using a card has been issued in step S502, the CPU 111 acquires card information from the IC card detected in step S502. On the other hand, in a case where a login instruction using the login key 424 or the ID key 213 has been issued in step S502, the CPU 111 acquires a user ID and a password input via the screen 420.

In step S504, the CPU 111 performs verification between the authentication information acquired in step S503 and the user data. If the CPU 111 permits login as a result of the verification (OK in step S504), the processing proceeds to step S505, and, if the CPU 111 does not permit login (NG in step S504), the processing proceeds to step S508. More specifically, in the case of a login instruction using a card, the CPU 111 searches the user data stored in the storage 114 with the information acquired from the IC card in step S503 used as a search key. If, as a result of search, a user having the same card ID 303 is present, the CPU 111 permits login, and, if no user having the same card ID 303 is present, the CPU 111 does not permit login.

Furthermore, in the case of a login instruction issued via the keyboard authentication screen 420, the CPU 111 searches the user data stored in the storage 114 with the ID acquired in step S503 used as a search key. If, as a result of search, a user having the same ID and the same password is present, the CPU 111 permits login, and, if no user having the same ID and the same password is present or if there is a difference in password even when a user having the same ID is present, the CPU 111 does not permit login.

In step S505, the CPU 111 generates a session identifier (ID) used to manage a session of login to the MFP 101, and temporarily stores the session ID in the RAM 113. Furthermore, the term "session" in the present exemplary embodiment refers to a series of interactions during a period (a serial period) from when the user logs in to the MFP 101 to when the user logs out. In present exemplary embodiment, the CPU 111 manages a session by assigning, to the session, a session ID for uniquely identifying the session when the user logs in. Moreover, in a case where a plurality of users is logging in to the MFP 101, the MFP 101 is supposed to control, for example, screens to be provided to the respective users based on session IDs.

In step S506, the CPU 111 acquires user data of the user permitted for login in step S504, generates session data in which the acquired user data is associated with the session ID generated in step S505, and temporarily stores the session data in the RAM 113. The session data includes the user ID 301 and the role 304 (authority information on a user). Moreover, the session data further includes an e-mail address of a user. The session data is used as appropriate for control operations in the flowcharts described below and for various functions of the MFP 101.

In step S507, the CPU 111 displays an operation screen for the MFP 101 on the panel 201. For example, the CPU 111 displays a main screen in which buttons (icons) for starting various functions included in the MFP 101 (for example, a copy function for printing on a sheet an image obtained by scanning an original using the reading unit 120 and a file transmission function for transmitting to an external device an image obtained by scanning an original using the reading unit 120) are displayed in a selectable manner. Furthermore, in a case where an initial screen (for example, a copy screen) of the MFP 101 is additionally set, the CPU 111 can display the initial screen. Moreover, in the present exemplary embodiment, processing performed from step S505 to step S507 is referred to as "login processing". When the login processing is completed and the operation screen of the MFP 101 is displayed on the panel 201, the CPU 111 ends the login processing.

On the other hand, in step S508, the CPU 111 notifies the user that login has failed, via the panel 201, and then ends the login processing.

The user, who has logged in to the MFP 101 through steps of login authentication illustrated in FIG. 5, is allowed to use various functions included in the MFP 101 via the operation unit 116.

<Copy Function>

Next, the method for the MFP 101 to receive a copy job is described with a copy function included in the MFP 101 taken as an example.

Figure 6A:
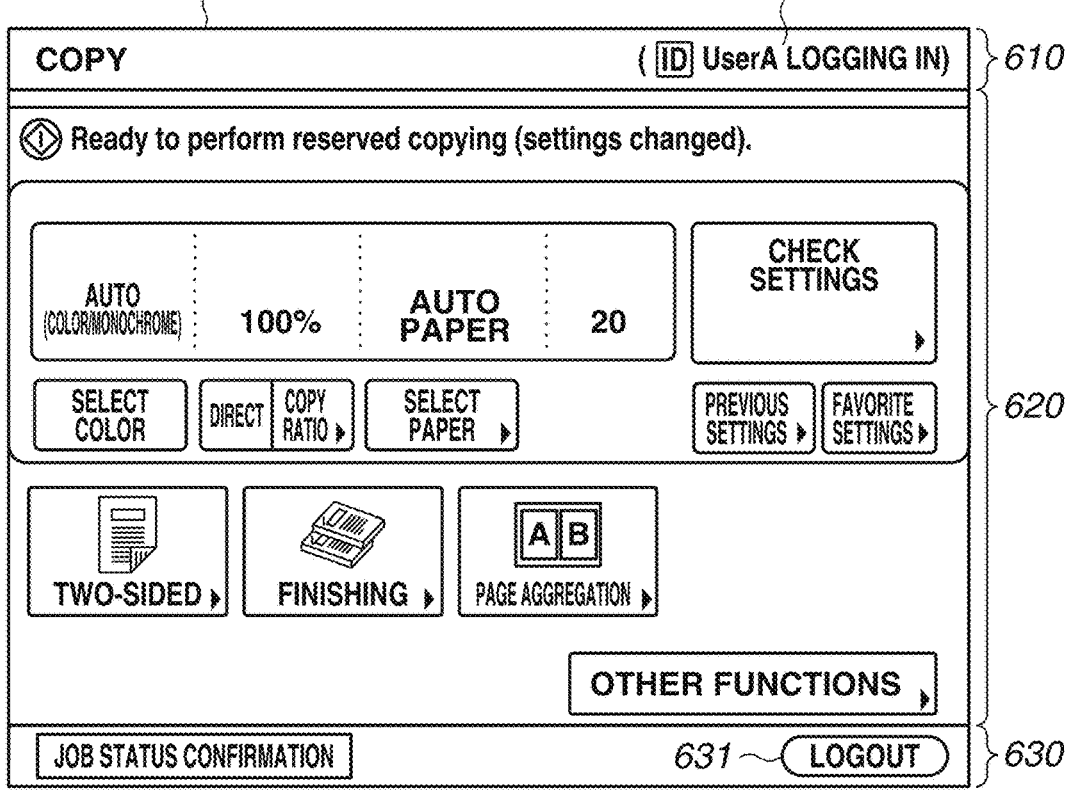
FIGS. 6A and 6B illustrate examples of screens concerning a copy function displayed on the panel of the operation unit.
Figure 6B:
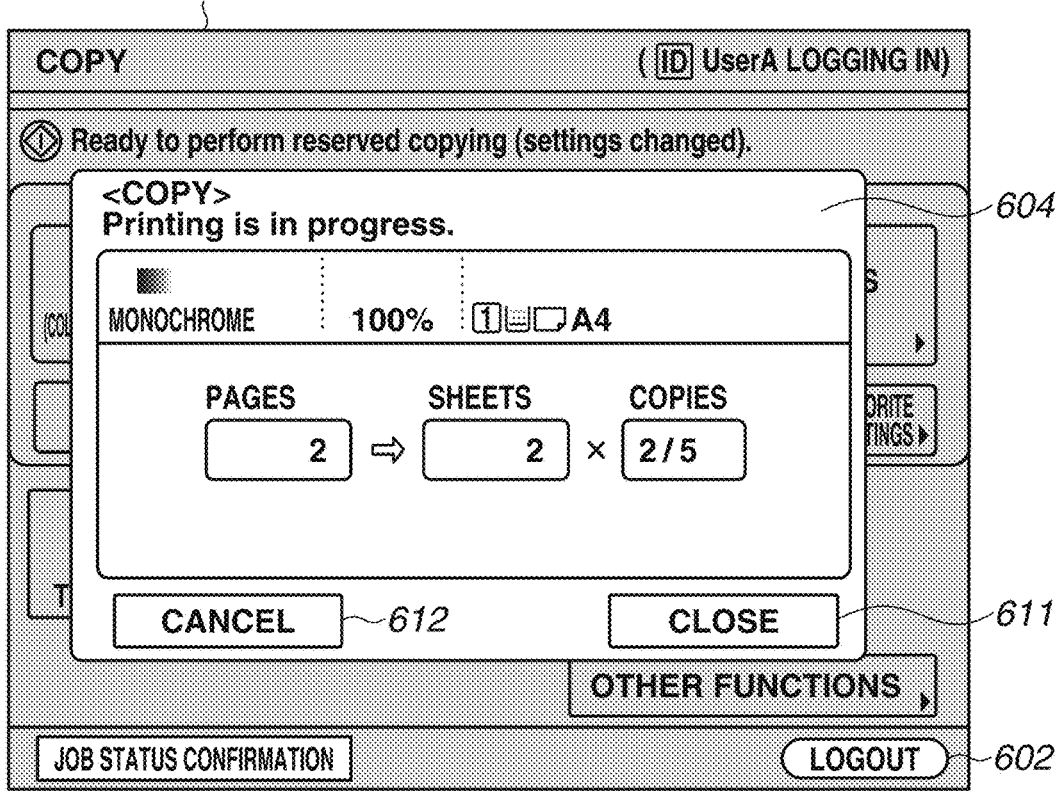

First, copy setting is described. FIG. 6A illustrates an example of a copy screen displayed on the panel 201. A setting screen 601 illustrated in FIG. 6A represents an example of a setting screen for copying. Moreover, an execution screen 603 illustrated in FIG. 6B represents an example of an execution screen displayed during execution of a copy job.

The user, who has logged in to the MFP 101, can select a copy function from a main screen (not illustrated) displayed on the panel 201.

The CPU 111 displays the setting screen 601 illustrated in FIG. 6A according to a button for the copy function being pressed by the user under the condition that the main screen is displayed.

The user can perform various copy settings via the setting screen 601. For example, the user can perform various settings, such as setting of the number of copies, switching between monochrome and color, and setting of two-sided printing (duplex printing). Furthermore, the copy setting further includes a great number of setting items that are not illustrated in FIG. 6A. Thus, it is difficult to perform all of the settings within one and the same screen. Accordingly, setting of a plurality of functions is supposed to be performed with an individual setting screen shifted for each setting item. Moreover, FIG. 6A illustrates an example case where the number of copies to print is set to "20".

Furthermore, the screen displayed on the panel 201 after the user logs in is composed of, for example, a menu bar 610, a main region 620, and a lower bar 630. The menu bar 610 is used to display, for example, the name of a function that the MFP 101 is executing and the user ID of the user who is logging in. An area 615 is used to display the user ID of the user who is logging in. Moreover, the main region 620 is used to display the items about a function that is being executed. Additionally, the lower bar 630 is used to display, for example, status information on the apparatus, which is to be displayed to the user, and a logout key 631.

The logout key 631 is a key that is used when the user logs out of the MFP 101. Moreover, the user can also log out using the ID key 213. Furthermore, if the user has already logged out of the MFP 101 when the ID key 213 is pressed, the CPU 111 performs processing similar to that performed when the login key 424 is pressed. Additionally, if the user is logging in to the MFP 101 when the ID key 213 is pressed, the CPU 111 performs processing similar to that performed when the logout key 631 is pressed.

Furthermore, if no operation continues for a predetermined time under the condition that the user is logging in, the CPU 111 automatically causes the user to log out of the MFP 101 (referred to as "automatic logout").

When the CPU 111 detects that the start key 212 is pressed under the condition that the setting screen 601 is displayed, the CPU 111 generates a copy job. Moreover, based on the copy job, the CPU 111 performs read processing, which reads an original via the reading unit 118, and print processing, which prints read image data on a sheet.

When execution of the generated copy job is started, the CPU 111 starts read processing, which reads an original via the reading unit 118, and also displays the execution screen 603 for copying illustrated in FIG. 6B on the panel 201. Upon completion of the read processing, the CPU 111 performs print processing, which prints image data of the read original on a sheet. Hereinafter, print processing which is performed based on a copy job is referred to as "copy job-based print processing". Moreover, read processing which is performed based on a copy job is referred to as "copy job-based read processing". Additionally, print processing is described below with reference to FIG. 7.

A cancel key 612 is a key used to cancel a copy job. Moreover, a close key 611 is an operation key that is displayed after the copy job-based read processing is completed, and is used to close a pop-up screen 604. When detecting that the close key 611 has been pressed under the condition that the screen 603 is displayed, the CPU 111 closes the pop-up screen 604 and displays the setting screen 601. The user can reserve a new copy job via the setting screen 601 (reserved copying).

In this way, according to the present exemplary embodiment, when read processing for an original of a generated copy job is complete, even if print processing that is performed based on the copy job is not complete, a next copy job can be generated.

More specifically, when reading of an original is complete, a print processing task, which prints read image data, is generated. Additionally, the print processing task refers to a unit of processing that controls the printing unit 120 to print an image on a sheet. In the present exemplary embodiment, a plurality of tasks of print processing is generated based on a copy job and a print job, which is described below. The plurality of tasks of print processing is sequentially performed by a task scheduler, which is described below.

When a print processing task generated based on a copy job is performed and printing on a sheet is then complete, execution of one copy job is complete.

Figure 7:
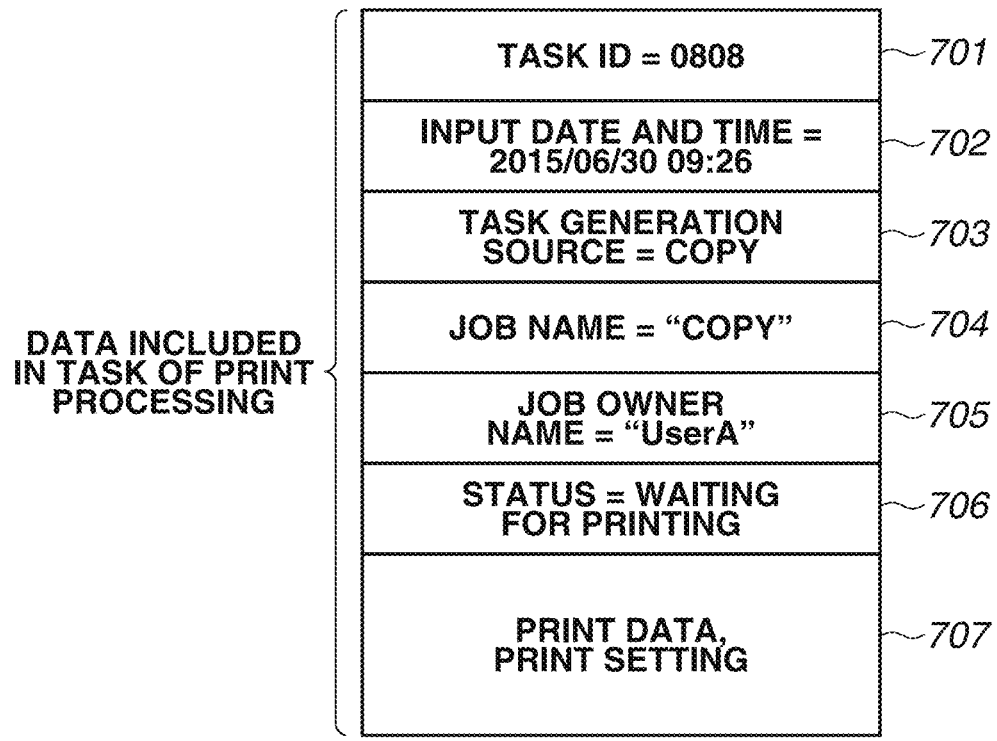
FIG. 7 illustrates data included in a print processing task.

Next, print processing is described. FIG. 7 illustrates an example of data included in a print processing task.

For example, the data included in a print processing task includes print data 707 containing data to be printed (such as image data) received when the print processing task is generated, print settings, and other information. Moreover, the data included in a print processing task has attributes appended thereto for managing print processing, such as a task ID 701, input date and time 702, task generation source 703, job name 704, job owner name 705, and status 706.

The task ID 701 is identification information for uniquely identifying print processing. The input date and time 702 is information indicating the date and time when the print processing task was generated. Moreover, the task generation source 703 is information for specifying the type of a job generated in the print processing task. In the example illustrated in FIG. 7, data included in a task of copy job-based print processing is illustrated.

The job name 704 is information obtained from a job used to generate the print processing task and is information indicating the name of the job. In the case of a task of print job-based print processing, the name for identifying a print job (for example, the file name of print data) is contained in the job name 704. Additionally, the job owner name 705 is information obtained from a job used to generate the print processing task and is information indicating the name of a user who has executed the job. In the example illustrated in FIG. 7, the job owner name 705 is "UserA". The status 706 is information used for the CPU 111 to control execution of a print processing task, and contains information, such as "printing in progress", "waiting for printing", "suspended", and "error state". Furthermore, these pieces of data used for print processing can be referred to or changed as appropriate in control operations illustrated in the below-described flowcharts and in control operations for various functions.

First, copy job-based print processing is described. When reading of an original by the reading unit 118 is complete during execution of a copy job, the CPU 111 generates a print processing task. At this time, "copy job" is stored as the task generation source 703, and "copy" is stored as the job name 704.

Next, print job-based print processing is described. When receiving PDL data from an external device, the CPU 111 causes a PDL analysis unit (not illustrated) to convert the PDL data into data adapted for printing and then generates a print job. When execution of the generated print job is started, the CPU 111 generates a task of print job-based print processing. At this time, "print job" is usually stored as the task generation source 703, and, for example, the file name of the PDL data is stored as the job name 704.

Furthermore, even when, for example, a report indicating the status of the MFP 101 is printed, the CPU 111 generates a report based on, for example, settings of devices and history information, and generates a print job for printing the report. When execution of the generated print job is started, the CPU 111 generates a print processing task. At this time, "report print job" is stored as the task generation source 703.

Thus, the MFP 101 executes a plurality of tasks of print processing, such as a task of copy job-based print processing and a task of print job-based print processing.

In the present exemplary embodiment, to manage execution of such a plurality of tasks of print processing, the CPU 111 determines the order of execution of the tasks of print processing as appropriate based on, for example, the order in which the tasks of print processing were generated, the attributes thereof, and the statuses thereof.

FIGS. 8A and 8B are diagrams used to illustrate control operations concerning the order of execution of a plurality of tasks of print processing. FIG. 8A illustrates an example of a management list used when four tasks of print processing are executed. Moreover, the management list is supposed to be stored in the RAM 113.

Management information 811 is an example of management information for managing a task for which printing is currently in progress in the printing unit 120. Moreover, management information 812 is an example of management information for managing a task which is waiting for printing. In this way, at the first row of the table, management information for a task to be first executed is stored. Additionally, pieces of management information for tasks which are waiting for printing are stored at the next and subsequent rows of the list.

Items 801 to 806 are fields in which attributes for managing a print processing task, which are respective pieces of information on the items 701 to 706 illustrated in FIG. 7, are stored.

Along with execution of a copy job or print job, at the print processing task is generated, the CPU 111 adds management information for the task to the list. Moreover, management information for a new task to be added is added to the last row of the list. Additionally, when new management information is added to the list, the rows in the list are permuted (the rows are sorted in the order of printing) as appropriate according to, for example, the type, status, and priority setting of a job based on which the added task is generated.

Furthermore, at the timing when a printing operation of the printing unit 120 is completed, the CPU 111 deletes management information for managing a print processing task for which the printing operation of the printing unit 120 is completed. Moreover, when the management information is deleted from the table, the CPU 111 shifts the pointer pointing to the first row of the list to the next row. Accordingly, when execution of the print processing task corresponding to the management information 811 is completed, the management information 811 is deleted, and the first row of the list becomes a row indicating management information 812. Additionally, when the status 806 in management information stored in the first row of the table is "waiting for printing", the CPU 111 rewrites the status 806 to read "printing in progress", and then executes a print processing task corresponding to the management information concerned.

In this way, in the present exemplary embodiment, each time a print processing task is generated, the CPU 111 adds management information for managing the task to the management list, and changes the order of printing as appropriate. Moreover, when printing performed based on a print processing task is complete, the CPU 111 deletes management information for managing the task, and then starts execution of a print processing task to be next executed. Accordingly, a plurality of tasks of print processing loaded into the MFP 101 is sequentially executed in the order of printing managed with the management list.

Furthermore, for example, when consumables used for printing run out, a printing operation of the printing unit 120 may be interrupted. In this case, the CPU 111 rewrites the status 806 in management information for managing the interrupted print processing task to read "stopped". Moreover, when processing concerning the interrupted printing operation is complete, the CPU 111 rewrites the status 806 in management information for managing the interrupted print processing task to read "printing in progress" or "waiting for printing".

Additionally, the CPU 111 can manage the order of execution of tasks of print processing based on a list structure, such as a queue, instead of the management list illustrated in FIG. 8A. In this case, each time a print processing task is generated, the CPU 111 stores the print processing task into a queue. Moreover, each time execution of the task is completed, the CPU 111 extracts a print processing task from the queue, and then executes the extracted print processing task. Accordingly, tasks are executed in turn starting with a task for a copy job instructed to be first executed. Moreover, when storing a print processing task into the queue, the CPU 111 determines priority as appropriate according to, for example, job attributes and settings of priority. The CPU 111 performs sorting within the queue as appropriate based on the determined priority.

In this way, the CPU 111 is able to control execution of a plurality of tasks of print processing generated in connection with execution of a copy job or print job, according to the task scheduling described with reference to FIG. 8A.

Furthermore, the MFP 101 according to the present exemplary embodiment includes a copy job suspension function for suspending all of the copy jobs. This function enables, under the condition that all of the copy jobs loaded into the MFP 101 are suspended, the user to perform an operation to select a copy job to be canceled.

When the stop key 211 is pressed under the condition that a screen associated with copying (the screen 601 or 603) is displayed on the panel 201, the CPU 111 changes all of the copy jobs that are being executed to a suspended state. Moreover, the CPU 111 displays a pop-up screen for selecting a copy job to be canceled from among a list of the suspended copy jobs.

Figure 9:
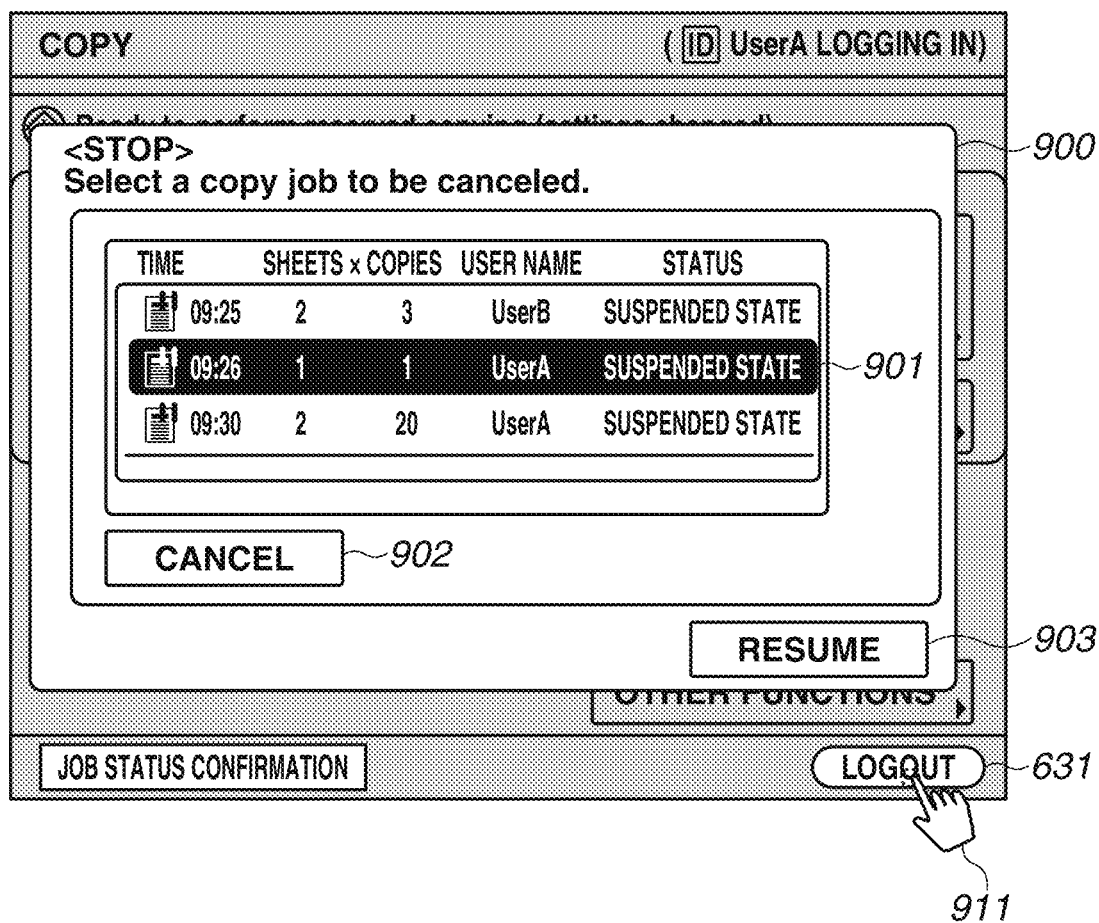
FIG. 9 illustrates an example of a copy job cancellation screen displayed on the panel of the operation unit.

FIG. 9 illustrates an example of a screen displayed on the panel 201, on which a pop-up screen 900 for canceling a copy job is also displayed as an example.

When the stop key 211 is pressed under the condition that a screen associated with copying (the screen 601 or 603) is displayed on the panel 201, the CPU 111 changes a copy job to a suspended state. Moreover, when a copy job enters a suspended state, copy job-based read processing, copy job-based print processing, and other processing are also suspended. Accordingly, when an instruction to suspend a copy job is issued, the status of a task of the corresponding copy job-based print processing is supposed to be also changed to "suspended".

For example, the CPU 111 changes tasks of print processing the task generation source of which is a copy job and the status of which is "printing in progress" or "waiting for printing" to a suspended state, as illustrated in FIG. 8B. When changing a task of copy job-based print processing the status of which is "printing in progress" to a suspended state, the CPU 111 controls the printing unit 120 to interrupt print processing on a sheet. Furthermore, when execution of copy job-based read processing is in progress, the CPU 111 changes the copy job-based read processing to a suspended state. Additionally, when reading of an original has been performed halfway, the CPU 111 can change the task to a suspended state after reading of the original is completed.

A list of copy jobs that have been suspended is displayed on the pop-up screen 900. The user can select a row indicating a copy job displayed on the screen 900 and cancel execution of the selected copy job. In the case of the screen 900, a row 901 is selected as an example.

A cancel key 902 is a key used to cancel execution of the selected copy job. When the cancel key 902 is pressed, the CPU 111 cancels execution of a copy job corresponding to the row selected via the screen 900. A resumption key 903 is a key used to resume execution of a copy job that is in a suspended state. When the resumption key 903 is pressed, the CPU 111 resumes execution of read processing and print processing of all of the copy jobs. Additionally, the cancellation processing includes processing for canceling a copy job and processing for deleting the canceled copy job.

When resuming execution of copy job-based print processing, the CPU 111 controls a task of the copy job-based print processing that is in a suspended state and changes the status of the task of the copy job-based print processing to "waiting for printing".

In this way, in the present exemplary embodiment, when the stop key 211 is pressed under the condition that the user is using a copy function (the screen 601 or 603 is displayed), all of the copy jobs can be suspended. This processing can prevent such a situation that, during selection of a copy job intended to be canceled, print processing proceeds and wasteful printout is performed.

Then, when the user who has pressed the stop key 211 sees a printing operation of the printing unit 120 having stopped, the user may misunderstand that a copy job that is being executed has been canceled. In this case, the user may log out of the image processing apparatus without checking a suspension screen displayed on the operation unit. Then, if logout processing is simply performed, such a situation would occur that no user is logging in to the image processing apparatus while the copy job remains suspended. In the case of the condition that no user is logging in, as a login screen is displayed, each function becomes unusable.

Moreover, in a case where a user who intends to cancel a copy job has pressed the stop key, the user, when becoming aware that the printout operation has been suspended, may misunderstand that a copy job that is being executed has been indeed canceled, and thus may leave the image processing apparatus without performing any operation. In this case, if the user is caused to log out by the automatic logout function, the image processing apparatus would be switched to a state in which no user is logging in.

In this case, a copy job loaded by the user who has logged out or a copy job loaded by another user would remain in a suspended state. Accordingly, even a job other than the job that the user intends to cancel would remain suspended.

In addition, a hardware resource used for a printing unit or the like may continue being occupied by a print processing task performed based on a copy job that is in a suspended state. In a case where a hardware resource used for a printing unit or the like is occupied, even if a new print processing task is generated based on a print job such as that indicated by a row 814 illustrated in FIG. 8B, a print processing task performed based on a copy job that is occupying the hardware resource cannot be overtaken by the new print processing task. Accordingly, a print processing task performed based on the new generated print job may also stop in a waiting state, so that the efficiency of printing may decrease.

In conventional image processing apparatuses, in an environment where authentication management premised on login of users is not performed, if the user leaves an image processing apparatus with all of the copy jobs suspended, the suspended state continues until a user who next uses the image processing apparatus issues an instruction to resume or cancel the copy jobs. In other words, until someone becomes aware that copy jobs have been suspended and deals with the suspended state, a situation would occur in which printing for the copy jobs or printing for any subsequent print job cannot be performed.

On the other hand, in image processing apparatuses in which authentication management premised on login of users is performed, it would be possible to control copy jobs using a user's login as a trigger.

In view of the above circumstances, in the present exemplary embodiment, when the user logs out of an image processing apparatus with a copy job suspended, execution of the copy job is controlled in such a manner that the copy job is prevented from remaining suspended. Further details thereof are described below.

The administrator of the MFP 101 is able to previously set how to process a copy job that is suspended at the time of logout.

FIG. 10 illustrates an example of a setting screen for a copy operation displayed on the panel 201. Radio buttons 1001 to 1004, which are radio buttons for selecting one setting from among a plurality of buttons (options), are used to set how to deal with a copy job that is in a suspended state at the time of logout. The radio button 1001 is a button that is selected when the administrator intends to perform control to cancel a copy job that is in a suspended state at the time of logout. The radio button 1002 is a button that is selected when the administrator intends to perform control to resume a copy job that is in a suspended state at the time of logout. The radio button 1003 is a button that is selected when the administrator intends to perform control, among copy jobs that are in a suspended state at the time of logout, to change only a copy job of the user who logs out of the MFP 101 to an error state and to resume a copy job of another user. Additionally, the radio button 1004 is a button that is selected when the administrator intends to perform control, among copy jobs that are in a suspended state at the time of logout, to cancel only a copy job of the user who logs out of the MFP 101 and to resume a copy job of another user.

An OK key 1011 is a key that is used when the administrator changes the settings of the MFP 101 based on the setting items set via the screen. Moreover, a setting cancel key 1012 is a key that is used when the administrator discards the settings set via the screen.

The administrator of the MFP 101 is able to previously set how to deal with a copy job that is in a suspended state at the time of logout (hereinafter referred to as "suspended-job processing setting"), via the screen illustrated in FIG. 10. The value of suspended-job processing setting that has been set by the administrator is stored in the storage 114 or the RAM 113, and is then referred to in the flowcharts described below.

For example, when the OK key 1011 is pressed under the condition that the radio button 1001 is selected, the CPU 111 stores "mode 1" as the suspended-job processing setting. When the OK key 1011 is pressed under the condition that the radio button 1002 is selected, the CPU 111 stores "mode 2" as the suspended-job processing setting. When the OK key 1011 is pressed under the condition that the radio button 1003 is selected, the CPU 111 stores "mode 3" as the suspended-job processing setting. When the OK key 1011 is pressed under the condition that the radio button 1004 is selected, the CPU 111 stores "mode 4" as the suspended-job processing setting.

The MFP 101 controls jobs based on the suspended-job processing setting that has been set by the administrator, in such a way as to prevent the jobs from remaining suspended.

Furthermore, while, in the present exemplary embodiment, an example has been described in which the administrator performs suspended-job processing setting via the screen illustrated in FIG. 10, this is not limiting. For example, an ordinary user (general user) can be allowed to perform suspended-job processing setting.

<Control over a Suspended Job>

Next, a method of controlling execution of a copy job in such a way as to prevent the copy job from remaining suspended, when the user logs out of the image processing apparatus under the condition that the user has suspended the copy job is described with reference to flowcharts illustrated in FIGS. 11 to 14. Each operation (step) in the flowcharts illustrated in FIGS. 11 to 14 is implemented by the CPU 111 reading a control program stored in the ROM 112 or the storage 114 onto the RAM 113 and executing the control program.

Figure 11:
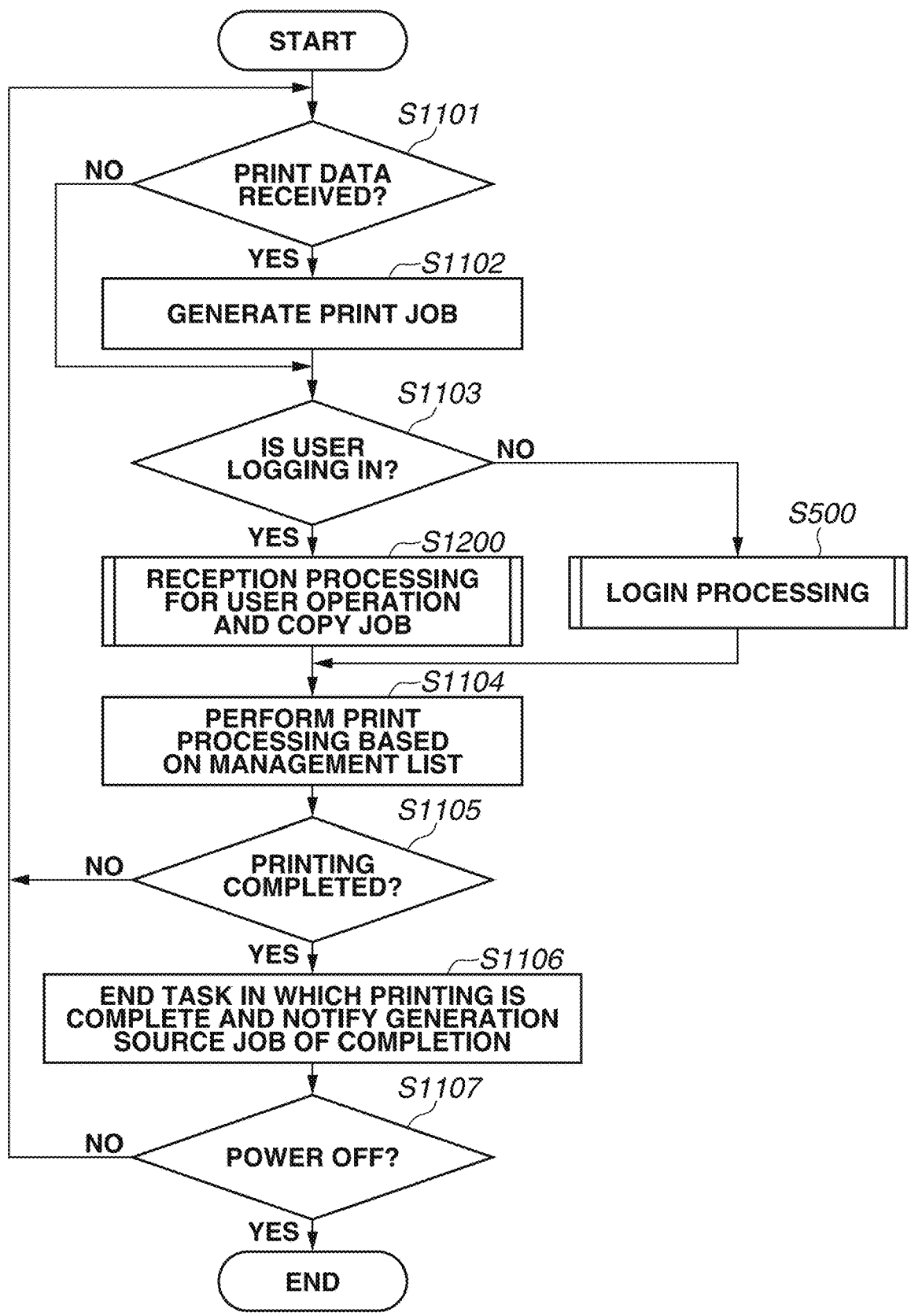
FIG. 11 is a flowchart illustrating a control method for a multifunction peripheral (MFP).

The CPU 111 is supposed to perform operations in the flowchart of FIG. 11 when the MFP 101 is powered on and is operating in a normal mode. When electric power is supplied to the MFP 101 and the MFP 101 becomes ready to use according to various boot programs, the CPU 111 performs control operations illustrated in the flowchart of FIG. 11. With reference to FIG. 11, an operation in which the MFP 101 executes tasks of print processing in turn based on management information managed in a management list and an operation in which the MFP 101 adds, to the management list, new management information for managing a print processing task are described.

In step S1101, the CPU 111 determines whether print data has been received from an external device. If the CPU 111 determines that print data has been received from an external device (YES in step S1101), the processing proceeds to step S1102, and, if the CPU 111 determines that no print data has been received (NO in step S1101), the processing proceeds to step S1103.

In step S1102, the CPU 111 causes a PDL analysis unit (not illustrated) to convert the print data received from the external device into data adapted for printing and then generates a print job. Furthermore, the CPU 111 starts execution of the print job and generates a print processing task based on the print job. Moreover, the CPU 111 adds, to the management list, management information for managing the generated print processing task. When adding the management information to the management list, the CPU 111 changes the order of tasks (order of printing) in the management list as appropriate.

In step S1103, the CPU 111 determines whether a user is logging in to the MFP 101. If the CPU 111 determines that a user is logging in to the MFP 101 (YES in step S1103), the processing proceeds to step S1200, and, if the CPU 111 determines that no user is logging in to the MFP 101 (NO in step S1103), the processing proceeds to step S500.

In step S500, the CPU 111 performs login processing illustrated in the flowchart of FIG. 5. Upon completion of a series of login processing operations, the processing proceeds to step S1104.

On the other hand, in step S1200, the CPU 111 performs a series of processing operations concerning an operation performed by the user via the operation unit 116 and reception processing for a copy job. Details of a series of processing operations concerning an operation performed by the user via the operation unit 116 and reception processing for a copy job are described below with reference to a flowchart illustrated in FIG. 12.

In step S1104, the CPU 111 executes a print processing task based on the management list stored in the RAM 113. The CPU 111 refers to information at the first row of the management list, and sequentially executes the corresponding print processing task. The CPU 111 transfers image data (data 707) included in the print processing task to the printing unit 120 via the printing unit I/F 119. Moreover, the CPU 111 controls the printing unit 120 based on the print setting to print the image data on a sheet.

In step S1105, the CPU 111 determines whether print processing in step S1104 has been completed. If the CPU 111 determines that the print processing has been completed (YES in step S1105), the processing proceeds to step S1106. On the other hand, if the CPU 111 determines that the print processing has not yet been completed (NO in step S1105), the processing returns to step S1101.

In step S1106, the CPU 111 ends the print processing task in which printing in step S1104 has been completed. As end processing for a print processing task, the CPU 111 notifies a job (copy job or print job), which is the generation source based on which the print processing task has been generated, that print processing has been completed. Moreover, the CPU 111 deletes, from the management list, management information corresponding to the print processing task in which printing in step S1104 has been completed. Upon completion of the deletion, the processing proceeds to step S1107.

Furthermore, the CPU 111 appropriately controls a print job or copy job that is being executed. When the print job or copy job receives a notification indicating that print processing has been completed, the CPU 111 ends execution of the job.

In step S1107, the CPU 111 determines whether an event of shifting to power-off has occurred. More specifically, when detecting that a power switch (not illustrated) has been turned off (YES in step S1107), the CPU 111 ends the series of processing operations, and, when not detecting that the power switch has been turned off (NO in step S1107), the processing returns to step S1101.

Furthermore, when ending the processing illustrated in FIG. 11, the CPU 111 performs processing for shutting down the MFP 101, and, upon completion of the shutdown processing, powers off the MFP 101.

Next, details of the series of processing operations performed by the user via the operation unit 116 and reception processing for a copy job, which is performed in step S1200, are described with reference to the flowchart illustrated in FIG. 12.

In step S1201, the CPU 111 determines whether an execution instruction for copying has been issued. More specifically, when the start key 212 is pressed under the condition that the above-mentioned setting screen for copying is displayed on the panel 201, the CPU 111 determines that the execution instruction for copying has been issued (YES in step S1201), and the processing then proceeds to step S1202. On the other hand, if the start key 212 is not pressed (NO in step S1201), the processing proceeds to step S1204 while skipping steps S1202 and S1203.

In step S1202, the CPU 111 generates a copy job based on settings performed via the setting screen, and then executes the generated copy job. The CPU 111 controls the reading unit 118 to perform read processing for reading an original as first processing of the copy job. When generation of an image of the original to be copied is completed by the read processing, the processing proceeds to step S1203. Furthermore, the number of pages of an original to be read by the read processing in step S1202 can be one or more than one.

In step S1203, the CPU 111 generates a print processing task based on the copy job generated in step S1202. Moreover, the CPU 111 adds, to the management list, management information for managing the generated print processing task. When adding the management information to the management list, the CPU 111 changes the order of tasks (order of printing) in the management list as appropriate. The processing operations performed in steps S1201 to S1203 enable receiving a plurality of copy jobs.

If, in step S1204, the CPU 111 determines that the stop key 211 has been pressed (YES in step S1204), the processing proceeds to step S1207, and, if the stop key 211 has not been pressed (NO in step S1204), the processing proceeds to step S1205.

If, in step S1205, the CPU 111 detects one of manual logout and automatic logout (YES in step S1205), the processing proceeds to step S1206. On the other hand, if the CPU 111 detects neither manual logout nor automatic logout (NO in step S1205), the CPU 111 ends the series of processing operations concerning a user operation and reception processing for a copy job, and then proceeds to the print processing in step S1104.

More specifically, when the CPU 111 detects an event of manual logout, which occurs in response to the user who is logging in performing an operation for an instruction to log out (an operation of pressing any one of the logout key 631 and the ID key 213), the processing proceeds to step S1206. Moreover, when the CPU 111 detects an event of automatic logout, which occurs when the user who is logging in performs no operation for a predetermined period, the processing also proceeds to step S1206. On the other hand, when the CPU 111 detects neither of the events of manual logout and automatic logout, the CPU 111 ends the series of processing operations concerning a user operation and reception processing for a copy job, and then proceeds to the print processing in step S1104. Additionally, events of logout are supposed to be managed for each session.

In step S1206, the CPU 111 discards session data for a session in which the logout event has occurred and cancels the authentication of the user. Moreover, the CPU 111 displays a login screen, such as the screen 410, on the panel 201, and then proceeds to the print processing in step S1104.

On the other hand, in step S1207, the CPU 111 determines whether there is a copy job that is being executed or waiting to be executed. In this processing, when copy job-based print processing or copy job-based read processing is being performed, the CPU 111 determines that there is a copy job that is being executed or waiting to be executed.

First, the copy job-based print processing is described. The CPU 111 refers to the management list stored in the RAM 113, and determines whether there is a task of copy job-based print processing in which printing is in progress or printing is waited.

More specifically, if, as a result of reference to the management list, there is a task generated based on a copy job and the status of which is "printing in progress" or "waiting for printing", the CPU 111 determines that there is a copy job that is being executed or waiting to be executed (YES in step S1207), and the processing then proceeds to cancellation processing for a copy job in step S1300. Moreover, when the copy job-based read processing, which is performed in step S1202, the CPU 111 also determines that there is a copy job that is being executed or waiting to be executed (YES in step S1207), and the processing then proceeds to cancellation processing for a copy job in step S1300.

On the other hand, if the CPU 111 determines that there is no copy job that is being executed or waiting to be executed (NO in step S1207), the processing proceeds to step S1205. Moreover, the processing in step S1207 is processing to perform control to prevent a cancellation screen from being displayed when, even if the stop key 211 is pressed, there is no copy job to be canceled.

In step S1300, the CPU 111 performs a series of processing operations concerning cancellation processing for a copy job. Subsequently, details of the series of processing operations concerning cancellation processing for a copy job (S1300) are described with reference to a flowchart illustrated in FIG. 13.

In step S1301, the CPU 111 suspends a copy job that is being executed or waiting to be executed. The CPU 111 refers to the management list stored in the RAM 113, and changes a print processing task which had been generated from a copy job and the status of which is "printing in progress" or "waiting for printing" to a suspended state. Moreover, when changing a print processing task the status of which is "printing in progress" to a suspended state, the CPU 111 controls the printing unit 120 to interrupt print processing on a sheet. Additionally, if copy job-based read processing is in progress, the CPU 111 controls the reading unit 118 to suspend the read processing. The processing in step S1301 enables suspending a copy job in which print processing is not yet completed.

In step S1302, the CPU 111 displays a cancellation screen for a copy job on the panel 201. The CPU 111 refers to the management list, and then displays, on the cancellation screen, a list of copy jobs that are in a suspended state. Additionally, the pop-up screen 900 illustrated in FIG. 9 is an example of the cancellation screen for a copy job.

In step S1303, the CPU 111 receives selection of a copy job to be canceled via the cancellation screen for a copy job. Moreover, a plurality of copy jobs can be allowed to be selected, or one copy job can be allowed to be selected.

If, in step S1304, the CPU 111 determines that the cancel key 902 is pressed (YES in step S1304), the processing proceeds to step S1305, and, if the cancel key 902 is not pressed (NO in step S1304), the processing proceeds to step S1307. In step S1305, the CPU 111 cancels execution of the copy job selected in step S1303. In a case where a copy job to be canceled is suspended in print processing, when canceling the copy job, the CPU 111 also cancels execution of a print processing task generated based on the copy job. Moreover, in a case where a copy job to be canceled is suspended in read processing, when canceling the copy job, the CPU 111 deletes read image data, and the processing then proceeds to step S1306.

In step S1306, the CPU 111 determines whether there is a copy job that is in a suspended state. If the CPU 111 determines there is a copy job in a suspended state (YES in step S1306), the processing returns to step S1302, in which the CPU 111 re-displays the cancellation screen for a copy job. If there is no copy job that is in a suspended state (NO in step S1306), the CPU 111 ends a series of processing operations concerning cancellation processing, and the processing then proceeds to the print processing in step S1104.

On the other hand, if, in step S1307, the CPU 111 determines that the resumption key 903 is pressed (YES in step S1307), the processing proceeds to step S1308, and, if the resumption key 903 is not pressed (NO in step S1307), the processing proceeds to step S1309.

In step S1308, the CPU 111 resumes the copy job that is in a suspended state, and the processing then proceeds to step S1104. In the case of a copy job that is suspended in print processing, the CPU 111 also resumes the copy job-based print processing. More specifically, the CPU 111 refers to the management list, and changes the status of a print processing task generated from a copy job and the status of which is "suspended" to "waiting for printing". Since the task of copy job-based print processing the status of which is "suspended" is changed to "waiting for printing", print processing is resumed at the print processing in step S1104. On the other hand, in the case of a copy job that is suspended in read processing, the CPU 111 resumes the copy job-based read processing.

On the other hand, if, in step S1309, the CPU 111 detects one of manual logout and automatic logout under the condition that the cancellation screen for a copy job is displayed on the panel 201 (YES in step S1309), the processing proceeds to step S1400. On the other hand, if the CPU 111 detects neither manual logout nor automatic logout (NO in step S1309), the processing returns to step S1303.

In step S1400, the CPU 111 performs a series of processing operations concerning copy job control during logout. Subsequently, details of the series of processing operations concerning copy job control during logout (S1400) are described with reference to a flowchart illustrated in FIG. 14.

In step S1401, the CPU 111 acquires the suspended-job processing setting stored in the storage 114 or the RAM 113. In step S1402, the CPU 111 determines whether the setting acquired in step S1401 is the setting of switching control between a copy job of a user who logs out and a copy job of another user. More specifically, if the suspended-job processing setting is "mode 3" or "mode 4", the CPU 111 determines that control is switched between a copy job of a user who logs out and a copy job of another user (YES in step S1402), and the processing then proceeds to step S1403. On the other hand, if the suspended-job processing setting is "mode 1" or "mode 2", the CPU 111 determines that control is not switched between a copy job of a user who logs out and a copy job of another user (NO in step S1402), and the processing then proceeds to step S1409.

In step S1403, the CPU 111 acquires the user ID of the user who logs out of the MFP 101.

In step S1404, the CPU 111 resumes a copy job that is in a suspended state and that has a job owner name different from the user ID acquired in step S1403. In the case of resuming a copy job that is suspended in print processing, the CPU 111 also resumes the copy job-based print processing. The CPU 111 refers to the management list stored in the RAM 113, and changes the status of a task the task generation source of which is a copy job, the status of which is "suspended", and the job owner name of which is different from the user ID acquired in step S1403 to "waiting for printing". Moreover, in the case of resuming a copy job that is suspended in read processing, the CPU 111 also resumes the copy job-based read processing.

In step S1405, the CPU 111 determines whether the suspended-job processing setting acquired in step S1401 is the setting of canceling execution of a copy job of the logged-in user that is suspended. More specifically, if the suspended-job processing setting is "mode 4", the CPU 111 determines that it is the setting of canceling execution of a copy job of the logged-in user that is suspended (YES in step S1405), and the processing then proceeds to step S1406. On the other hand, if the suspended-job processing setting is "mode 3", the CPU 111 determines that it is not the setting of canceling execution of a copy job of the logged-in user that is suspended (NO in step S1405), and the processing then proceeds to step S1407.

In step S1406, the CPU 111 cancels execution of a copy job that is suspended. In the case of canceling execution of a copy job that is suspended in print processing, the CPU 111 also cancels a print processing task generated based on the copy job. Moreover, in the case of canceling execution of a coy job that is suspended in read processing, the CPU 111 also deletes image data generated by the read processing.

In step S1407, the CPU 111 changes the status of a copy job that is suspended in print processing to "error state". In the case of changing the status of a copy job that is suspended in print processing to "error state", the CPU 111 also changes a print processing task generated based on the copy job to "error state". More specifically, the CPU 111 refers to the management list stored in the RAM 113, and changes the status of a task generated based on a copy job and the status of which is "suspended" to "error state". Upon completion of processing in step S1407, the processing proceeds to step S1408. Furthermore, with regard to a copy job that is suspended while occupying the printing unit 120, the CPU 111 discharges up to a sheet that is in the process of being printed to a discharge tray (not illustrated), releases the occupation of the printing unit 120, and then changes the status of the task to "error state".

In step S1408, the CPU 111 cancels execution of a copy job that is suspended in read processing and deletes image data generated by the read processing, and the processing then proceeds to step S1310.

Furthermore, the processing in step S1408 is processing for preventing a copy job that occupies the reading unit 118 from remaining in an error state.

The processing in step S1407 causes a copy job of the user who is logging in to remain in an error state. Moreover, a print processing task generated based on a copy job that is in an error state is supposed to be set lower in priority of processing than tasks of print processing the statuses of which are "waiting for printing" and "printing in progress". Accordingly, a new generated print processing task or a print processing task the status of which is "waiting for printing" can overtake a print processing task the status of which is "error state" and can be first executed. The user can resume execution of a copy job by issuing a resumption instruction for the copy job via a status confirmation screen (not illustrated). Upon receipt of the execution resumption instruction, the CPU 111 changes the status of a print processing task corresponding to the copy job to "waiting for printing", and resumes the print processing task.

On the other hand, in step S1409, the CPU 111 determines whether the suspended-job processing setting acquired in step S1401 is the setting of canceling execution of a copy job that is suspended. More specifically, if the suspended-job processing setting is "mode 1", the CPU 111 determines that it is the setting of canceling execution of a copy job of the logged-in user that is suspended (YES in step S1409), and the processing then proceeds to step S1410. On the other hand, if the suspended-job processing setting is "mode 2", the CPU 111 determines that it is not the setting of canceling execution of a copy job that is suspended (NO in step S1409), and the processing then proceeds to step S1411.

In step S1410, the CPU 111 cancels execution of a copy job that is suspended. In the case of canceling execution of a copy job that is suspended in print processing, the CPU 111 also cancels a print processing task generated based on the copy job. Moreover, in the case of canceling execution of a coy job that is suspended in read processing, the CPU 111 also deletes image data generated by the read processing.

On the other hand, in step S1411, the CPU 111 resumes a copy job that is in a suspended state. In the case of resuming a copy job that is suspended in print processing, the CPU 111 also resumes a print processing task generated based on the copy job. In the case of resuming a copy job that is suspended in read processing, the CPU 111 also resumes the read processing by controlling the reading unit 118.

Figure 14:
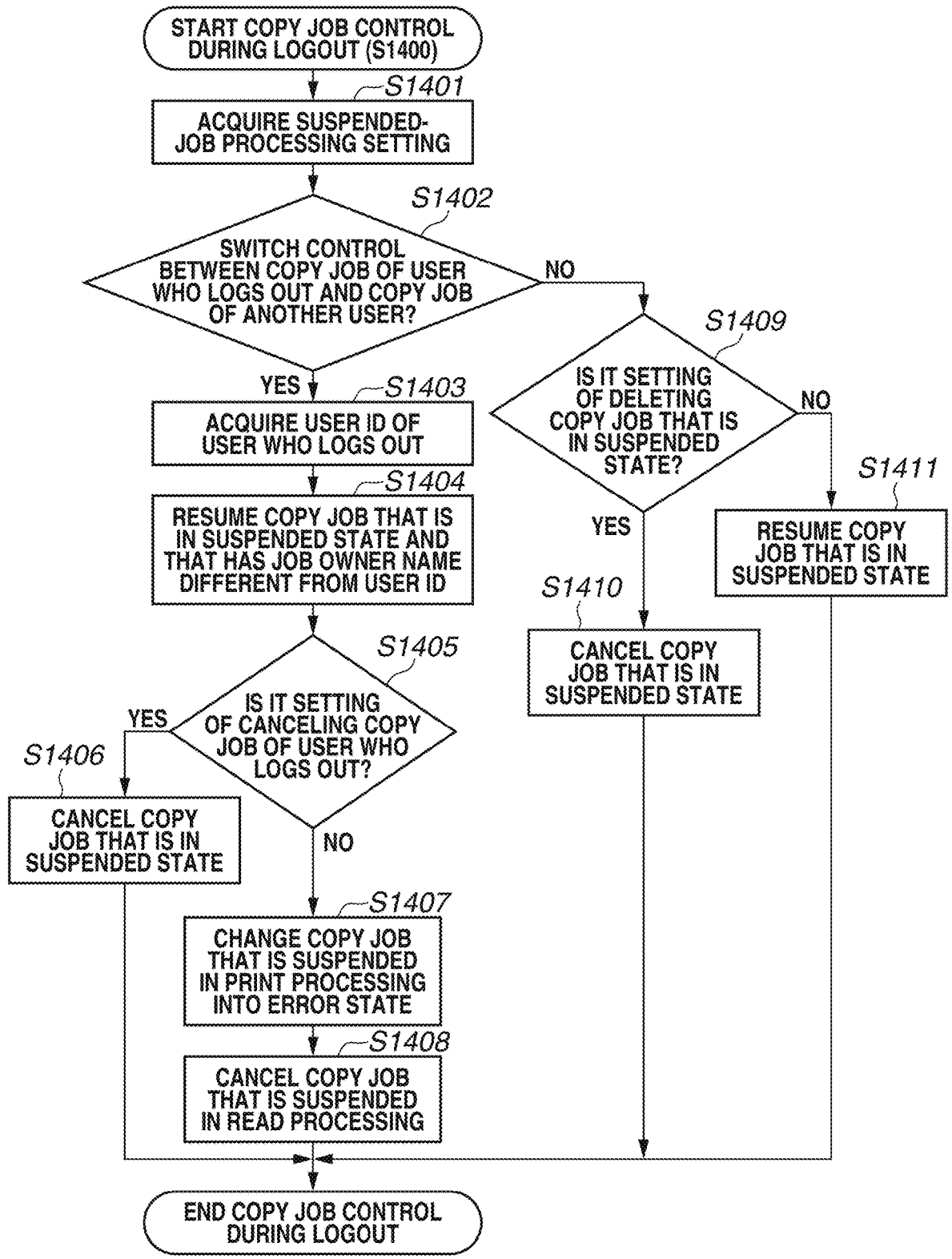
FIG. 14 is a flowchart illustrating control for copy job performed during logout.

A series of processing operations illustrated in FIG. 14 enables controlling a copy job in such a way as to prevent, when an event in which the user logs out of the apparatus occurs, the copy job from remaining suspended.

Referring back to FIG. 13, in step S1310, the CPU 111 discards session data on a session in which the logout event has occurred, and cancels the authentication of the user. Upon completion of processing in step S1310, the processing proceeds to the print processing in step S1104.

As described above, according to the present exemplary embodiment, when the user logs out of an image processing apparatus with a copy job suspended by pressing a stop key, the copy job can be prevented from remaining suspended. Accordingly, the occupation of the printing unit 120 by a print processing task generated based on the copy job that is suspended can be released based on an event in which the user logs out. Moreover, the occupation of the reading unit 118 by read processing performed based on the copy job that is suspended can also be released. Therefore, the execution efficiency of jobs can be increased. Additionally, based on an event in which the user logs out, the execution of a copy job of the user who has logged out can be canceled and the execution of a copy job of another user can be resumed.

In the first exemplary embodiment, an example has been described in which the execution of a copy job of the user who has logged out is canceled and the execution of a copy job of another user is resumed. In a second exemplary embodiment, which focuses attention on a session, an example is described in which the execution of a copy job instructed to be executed in a session that is targeted for logout processing is canceled and the execution of the other copy jobs is resumed. Moreover, an example is also described in which the execution of a copy job instructed to be executed in a session that is targeted for logout processing and having the most recent date and time when an instruction for execution was issued is canceled and the execution of the other copy jobs is resumed. Furthermore, in the second exemplary embodiment, the hardware configuration of an apparatus employed therein is similar to that in the first exemplary embodiment. Moreover, with regard to configurations and control operations similar to those in the first exemplary embodiment, the detailed description thereof is omitted.

Figure 15:
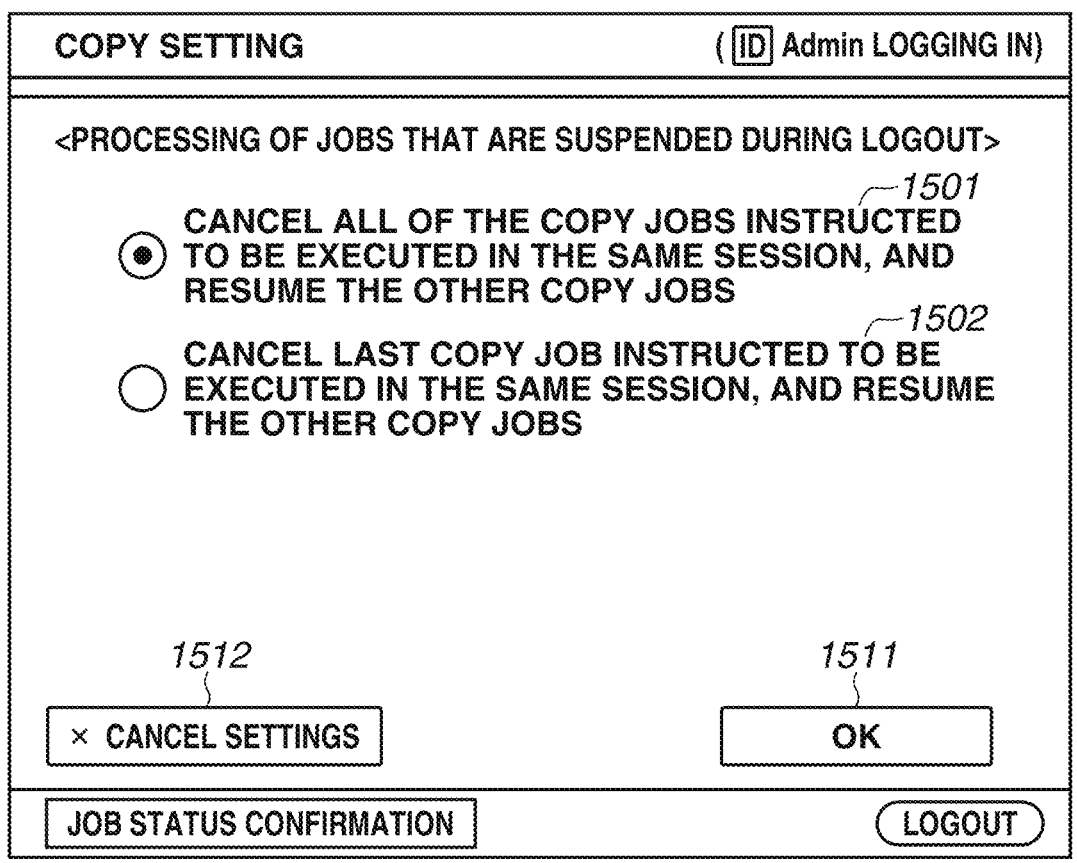
FIG. 15 illustrates an example of a setting screen displayed on the panel of the operation unit according to a second exemplary embodiment.

The administrator of the MFP 101 is able to previously set how to process a copy job that is suspended at the time of logout. FIG. 15 illustrates an example of a setting screen for a copy operation, which is displayed on the panel 201 in the second exemplary embodiment and is a substitute for the setting screen illustrated in FIG. 10 in the first exemplary embodiment.

Radio buttons 1501 to 1502, which are radio buttons for selecting one setting from among a plurality of buttons (options), are used to set how to deal with a copy job that is in a suspended state at the time of logout. The radio button 1501 is a button that is selected when the administrator intends to perform control in such way as to cancel execution of a copy job instructed to be executed in a session that is targeted for logout processing, from among copy jobs that are suspended, and to resume execution of the other copy jobs. Moreover, the radio button 1502 is a button that is selected when the administrator intends to perform control in such way as to cancel execution of a copy job most recently instructed to be executed in the session that is targeted for logout processing, from among copy jobs that are suspended, and to resume execution of the other jobs.

An OK key 1511 is a key that is used when the administrator changes the settings of the MFP 101 based on setting items set via the screen. Moreover, a setting cancel key 1512 is a key that is used when the administrator discards the settings set via the screen.

The administrator of the MFP 101 is able to previously set how to deal with a copy job that is in a suspended state at the time of logout (hereinafter referred to as "suspended-job processing setting in the second exemplary embodiment"), via the screen illustrated in FIG. 15. The value of suspended-job processing setting in the second exemplary embodiment that has been set by the administrator is stored in the storage 114 or the RAM 113, and is then referred to in the flowcharts described below.

For example, when the OK key 1511 is pressed under the condition that the radio button 1501 is selected, the CPU 111 stores "mode 1" as the suspended-job processing setting in the second exemplary embodiment. When the OK key 1511 is pressed under the condition that the radio button 1502 is selected, the CPU 111 stores "mode 2" as the suspended-job processing setting in the second exemplary embodiment. The MFP 101 controls jobs based on the suspended-job processing setting in the second exemplary embodiment that has been set by the administrator, in such a way as to prevent the jobs from remaining suspended.

Furthermore, while, in the second exemplary embodiment, an example has been described in which the administrator performs suspended-job processing setting in the second exemplary embodiment via the screen illustrated in FIG. 15, this is not limiting. For example, an ordinary user (general user) can be allowed to perform suspended-job processing setting in the second exemplary embodiment.

FIG. 16 and FIGS. 17A, 17B, and 17C illustrate tasks of print processing and the print processing in the second exemplary embodiment.

First, print processing is described. FIG. 16 illustrates an example of data included in a print processing task. The data included in a print processing task includes, as in the first exemplary embodiment, print data 707 containing data to be printed (such as image data) obtained from a job from which the print processing task is generated, print settings, and other information. Moreover, the data included in a print processing task has attributes of print processing 701 to 706 appended thereto. Moreover, in the second exemplary embodiment, the data included in a print processing task has a session ID 1601 appended thereto. These attributes are used as appropriate in the flowcharts described below.

Next, control over handling of a suspended job at the time of logout is described with reference to FIGS. 17A, 17B, and 17C. FIGS. 17A, 17B, and 17C illustrate control over handling of a suspended job at the time of logout. FIG. 17A illustrates an example of a management list used to manage tasks of print processing, and indicates a state after the stop key 211 is pressed when six tasks of print processing are being executed or waiting for execution. As indicated in the example illustrated in FIG. 17A, no session ID is appended to a job that is input without login (for example, a normal print job).

Moreover, FIGS. 17B and 17C illustrate control over tasks of print processing performed when the user logs out of the MFP 101 with copy jobs suspended.

FIG. 17B illustrates handling of a suspended job at the time of logout when "mode 1" is specified as the suspended-job processing setting. In the example illustrated in FIG. 17B, the session ID of a session that is targeted for logout processing is "0003".

When "mode 1" is specified, since the execution of a job instructed to be executed in a session that is targeted for logout processing is canceled, a print processing task having the session ID "0003" is canceled. Accordingly, tasks of print processing corresponding to pieces of management information 1712 and 1713 are canceled. On the other hand, since the task corresponding to management information 1711 is a task generated based on a job instructed by the same "UserA" to be executed but is a task generated based on a job instructed to be executed in a different session, that task is not cancelled but resumed.

Moreover, when copy job-based read processing is being performed, similar handling is also performed on the copy job-based read processing. When read processing instructed to be executed in a session that is targeted for logout processing is being performed, the read processing is also canceled.

FIG. 17C illustrates handling of a suspended job at the time of logout when "mode 2" is specified as the suspended-job processing setting. In the example illustrated in FIG. 17C, the session ID of a session that is targeted for logout processing is "0003".

When "mode 2" is specified, the execution of a copy job having the most recent date and time when an instruction for execution was issued in a session targeted for logout processing is canceled, and the execution of the other copy jobs is resumed. Accordingly, the execution of a copy job the session ID of which is "0003" and the date and time of which is most recent is canceled.

Thus, if read processing is being performed in a copy job instructed to be executed in a session that is targeted for logout processing, the read processing is canceled, and tasks of print processing generated based on the other copy jobs are resumed.

On the other hand, if read processing is not being performed in a copy job instructed to be executed in a session that is targeted for logout processing, the most recent print processing task from among tasks of print processing instructed to be executed in the session that is targeted for logout processing is canceled. In this case, as illustrated in FIG. 17C, a print processing task corresponding to management information 1713 is canceled, and the other tasks of print processing are resumed.

<Control over a Suspended Job>

Next, a method of controlling execution of a copy job in such a way as to prevent the copy job from remaining suspended in the second exemplary embodiment is described with reference to flowcharts illustrated in FIGS. 11 to 13 and FIG. 18. Each operation (step) in the flowcharts illustrated in FIGS. 11 to 13 and FIG. 18 is implemented by the CPU 111 reading a control program stored in the ROM 112 or the storage 114 onto the RAM 113 and executing the control program.

Figure 12:
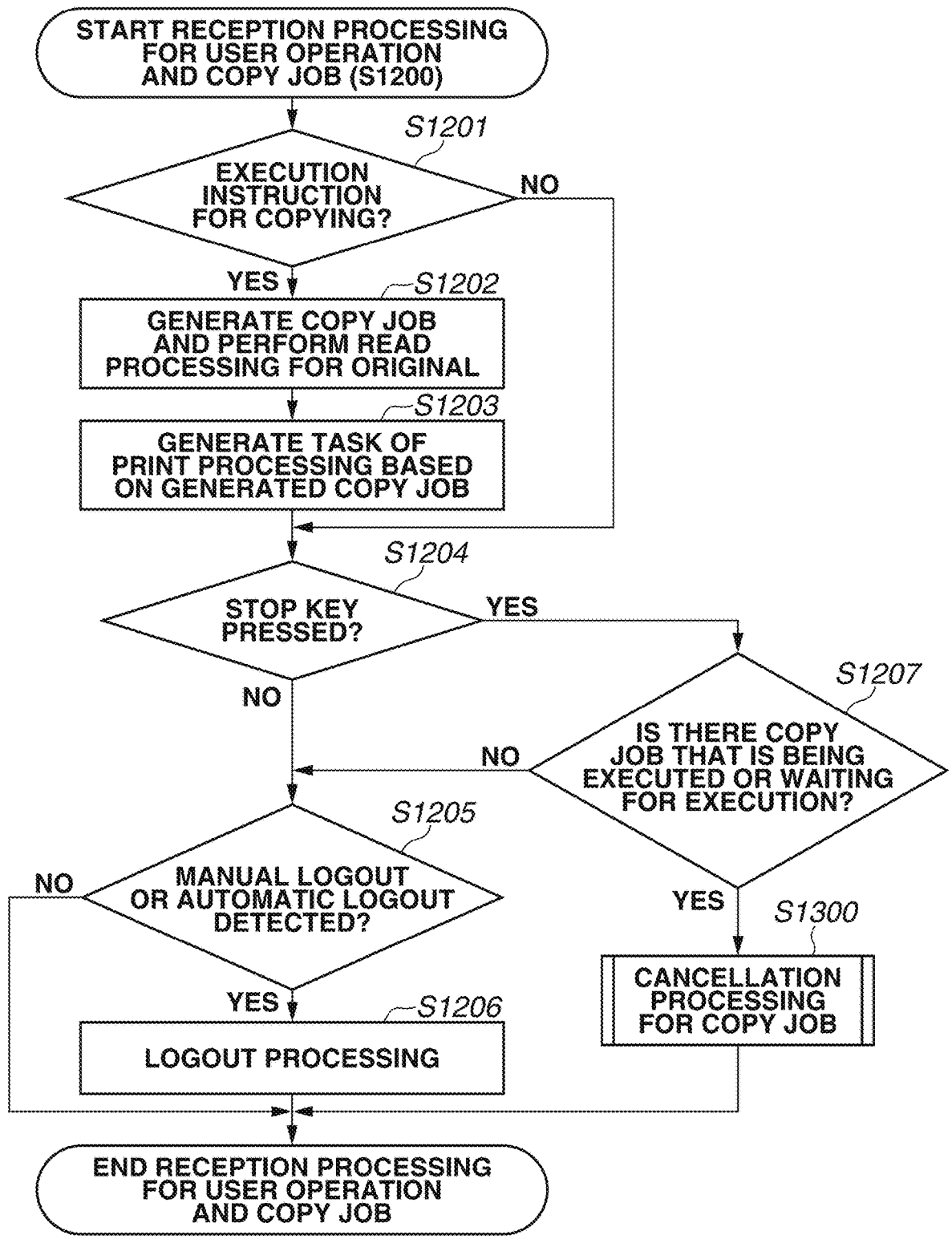
FIG. 12 is a flowchart illustrating reception control for a copy job performed via the operation unit.
Figure 13:
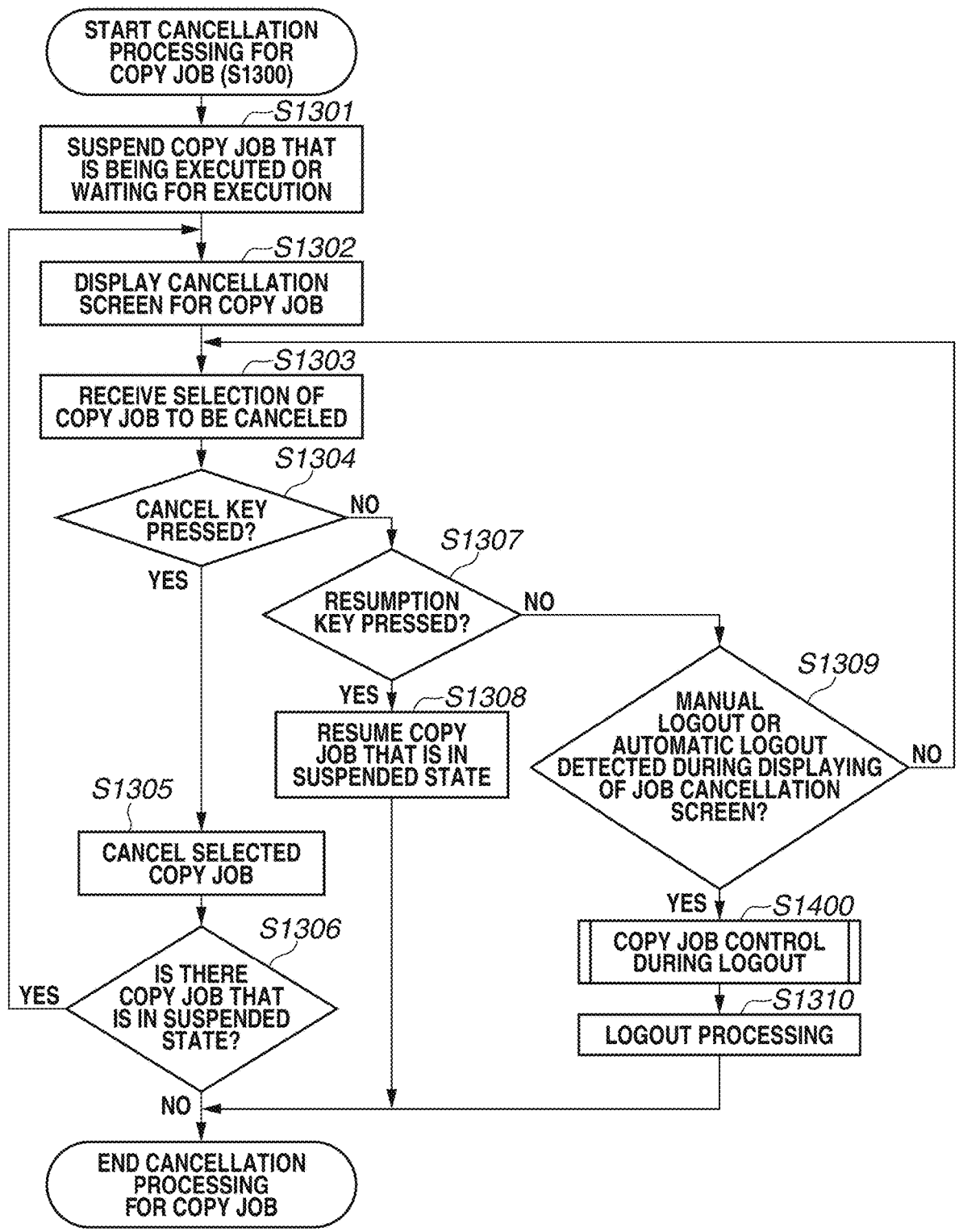
FIG. 13 is a flowchart illustrating cancellation control for a copy job.

Processing operations in the flowcharts of FIGS. 11 to 13 are similar to those in the first exemplary embodiment, and are, therefore, omitted from description. In the second exemplary embodiment, processing operations illustrated in FIG. 18 are performed instead of a series of processing operations concerning copy job control during logout in the first exemplary embodiment illustrated in FIG. 14.

In step S1801, the CPU 111 acquires suspended-job processing setting stored in the storage 114 or the RAM 113. In step S1802, the CPU 111 acquires the session ID of a session targeted for logout.

In step S1803, the CPU 111 resumes a copy job instructed to be executed in a session different from the session ID acquired in step S1802. In the case of resuming execution of a copy job that is suspended in print processing, the CPU 111 also resumes a print processing task generated based on the copy job.

In step S1804, the CPU 111 determines whether the setting acquired in step S1801 is the setting of canceling all of the jobs instructed to be executed in the same session. More specifically, if the suspended-job processing setting is "mode 1", the CPU 111 determines that it is the setting of canceling all of the jobs instructed to be executed in the same session (YES in step S1804), and the processing then proceeds to step S1805. On the other hand, if the suspended-job processing setting is "mode 2", the CPU 111 determines that it is not the setting of canceling all of the jobs instructed to be executed in the same session (NO in step S1804), and the processing then proceeds to step S1806.

In step S1805, the CPU 111 cancels a copy job instructed to be executed in a session that is targeted for logout processing based on the session ID acquired in step S1802.

More specifically, if read processing of a copy job instructed to be executed in a session that is targeted for logout processing is in a suspended state, the CPU 111 cancels the read processing. Moreover, the CPU 111 cancels a print processing task coinciding with the session ID acquired in step S1802.

In step S1806, the CPU 111 cancels execution of a copy job instructed to be executed in a session that is targeted for logout processing based on the session ID and having the most recent date and time when an instruction for execution was issued. Moreover, the CPU 111 resumes execution of the other copy jobs. More specifically, if read processing of a copy job instructed to be executed in a session that is targeted for logout processing is in a suspended state, the CPU 111 cancels the read processing and resumes other tasks of processing. Moreover, if read processing of a copy job instructed to be executed in a session that is targeted for logout processing is not in a suspended state, the CPU 111 processes tasks of print processing as follows. The CPU 111 cancels a print processing task having the most recent date and time when an instruction for execution was issued from among tasks of print processing coinciding with the session ID acquired in step S1802, and resumes the other tasks of print processing.

A series of processing operations illustrated in FIG. 18 enables controlling a copy job in such a way as to prevent, when an event in which the user logs out of the MFP 101 occurs, the copy job from remaining suspended.

As described above, according to the second exemplary embodiment, the execution of a copy job instructed to be executed in a session that is targeted for logout processing based on an event in which the user logs out is canceled, and the execution of the other copy jobs can be resumed. These processing operations enable preventing a copy job from remaining suspended. Moreover, these processing operations enable preventing a copy job of another user or a copy job of the same user instructed to be executed in a separate session from being unintentionally canceled.

Furthermore, in a case where "mode 2" is set, a copy job most recently instructed to be executed in a session that is targeted for logout processing can be canceled, and the execution of the other copy jobs can be resumed. Moreover, in the control operation in "mode 2", since it is considered that, when performing processing for cancellation, the user often intends to cancel the latest processing, the CPU 111 cancels only a copy job most recently instructed to be executed in the same session, and resumes the other copy jobs.

In the first exemplary embodiment and the second exemplary embodiment, an example has been described in which, when the user logs out of the image processing apparatus, a copy job is canceled or resumed in such a way as to prevent the copy job from remaining suspended.

In a third exemplary embodiment, a method of performing control to determine whether a cancellation instruction to cancel one of copy jobs that are in a suspended state has been issued via a cancellation screen and to resume the other copy jobs that are in a suspended state, in addition to the control operation performed in the first exemplary embodiment, is described.

Furthermore, in the third exemplary embodiment, the hardware configuration of an apparatus employed therein is similar to that in the first exemplary embodiment. Moreover, with regard to configurations and control operations similar to those in the first exemplary embodiment, the detailed description thereof is omitted.

Figure 19:
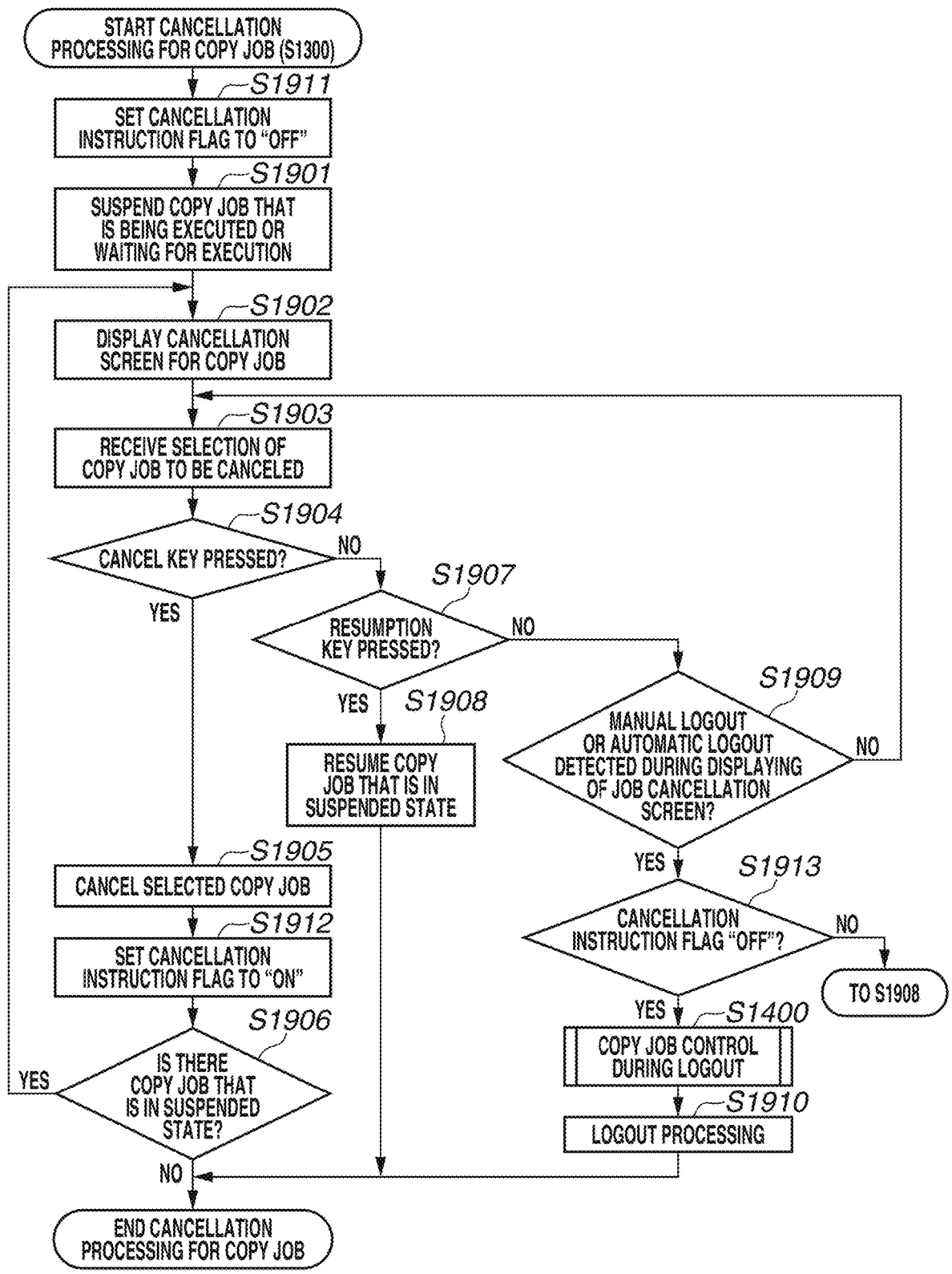
FIG. 19 is a flowchart illustrating cancellation control for a copy job according to a third exemplary embodiment.

A method of controlling cancellation processing for a copy job in the third exemplary embodiment is described with reference to a flowchart illustrated in FIG. 19. The flowchart of FIG. 19 is a flowchart serving as an alternative to the flowchart of FIG. 13 in the first exemplary embodiment, and illustrates an operation performed when it is determined in step S1207 that there is a copy job that is being executed or waiting to be executed.

First, in step S1911, the CPU 111 sets a cancellation instruction flag to "OFF", and the processing then proceeds to step S1901. The cancellation instruction flag is temporarily stored in the RAM 113 and is referred to in steps described below.

In steps S1901 to S1903, the CPU 111 suspends a copy job and receives selection of a copy job to be canceled from the user, as in steps S1301 to S1303 in the first exemplary embodiment.

If, in step S1904, the CPU 111 determines that the cancel key 902 is pressed (YES in step S1904), the processing proceeds to step S1905, and, if the cancel key 902 is not pressed (NO in step S1904), the processing proceeds to step S1907.

In step S1905, the CPU 111 cancels execution of the copy job selected in step S1903, and the processing then proceeds to step S1912. In step S1912, the CPU 111 changes the cancellation instruction flag set in step S1911 to "ON", and the processing then proceeds to step S1906. If, in step S1906, the CPU 111 determines that there is a copy job that is in a suspended state (YES in step S1906), as in step S1306, the processing returns to step S1902, in which the CPU 111 re-displays the cancellation screen for a copy job. If there is no copy job that is in a suspended state (NO in step S1906), the CPU 111 ends a series of the processing operations.

On the other hand, if, in step S1907, the CPU 111 determines that the resumption key 903 is pressed (YES in step S1907), then in step S1908, the CPU 111 resumes the copy job that is in a suspended state, as in steps S1307 and S1308, and then ends a series of the processing operations. On the other hand, if the resumption key 903 is not pressed (NO in step S1907), the processing proceeds to step S1909.

If, in step S1909, the CPU 111 detects one of manual logout and automatic logout under the condition that the cancellation screen for a copy job is displayed on the panel 201 (YES in step S1909), the processing proceeds to step S1913. On the other hand, if the CPU 111 detects neither manual logout nor automatic logout (NO in step S1909), the processing returns to step S1903.

In step S1913, the CPU 111 refers to the RAM 113 and determines whether the cancellation instruction flag is "OFF". If the CPU 111 determines that the cancellation instruction flag is "OFF" (YES in step S1913), the processing proceeds to step S1400. In step S1400, the CPU 111 performs the copy job control during logout and the logout processing, and then ends a series of the processing operations. On the other hand, if the cancellation instruction flag is not "OFF" (is "ON") (NO in step S1913), the processing proceeds to step S1908, in which the CPU 111 resumes the copy job that is in a suspended state, and then ends a series of the processing operations.

As described above, according to the third exemplary embodiment, it is determined whether a cancellation instruction to cancel any one of copy jobs that are in a suspended state has been issued, and, if the cancellation instruction has been issued during logout, the other copy jobs that are in a suspended state can be resumed. Accordingly, in a case where the user logs out after canceling one or more copy jobs, the other copy jobs can be resumed without being canceled.

Furthermore, although the third exemplary embodiment is presumed to be applied to the first exemplary embodiment, this is not limiting. The third exemplary embodiment can also be applied to the second exemplary embodiment.

Moreover, although, in the first to third exemplary embodiments, an example has been described in which, when pressing of the stop key is detected during execution of a copy job, the copy job is suspended, this is not limiting.

For example, the above-described exemplary embodiments can also be applied to a case of temporarily suspending a transmission job which reads image data and transmits the image data to an external device such as the PC 102. Moreover, according to a screen displayed on the panel 201, the type of a job that is suspended when the stop key is pressed or the attribute of the job can be changed as appropriate. For example, the CPU 111 can be configured to suspend a copy job when a screen related to copying is displayed. Additionally, the CPU 111 can be configured to suspend a print job when a screen related to printing of print data (for example, a screen for the function of printing data stored in a storage or a screen related to stored file printing) is displayed.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to exemplary embodiments, in an image processing apparatus that executes a plurality of copy jobs, when the user logs out of the image processing apparatus, a job including print processing can be prevented from remaining suspended. Accordingly, execution of jobs can be smoothly performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus including an operation unit,
the image forming apparatus comprising:
a memory device storing instructions; and
at least one processor that executes the instructions and causes the image forming apparatus to:
suspend, based on operation of a user who has logged into the image forming apparatus, jobs including a job which is being executed and a job which is to be executed;
if a first setting is preset, resume, based on detection of logout of the user in a state that the jobs are suspended, a job instructed to be executed by another user from among the suspended jobs wherein another job instructed to be executed by the user is kept suspended; and
if a second setting is preset, resume, based on detection of logout of the user in the state that the jobs are suspended, the job instructed to be executed by another user and the another job instructed to be executed by the user.

2. The image forming apparatus according to claim 1, wherein the job instructed to be executed by the another user is performed prior to the another job instructed to be executed by the user.

3. The image forming apparatus according to claim 1, wherein the another job instructed to be executed by the user is kept suspended in an error state.

4. The image forming apparatus according to claim 1, further comprising a user interface that is able to set one of the first setting and the second setting.

5. The image forming apparatus according to claim 1, wherein the jobs include a copy job.

6. A control method for an image forming apparatus including an operation unit, the method comprising:
suspending, based on operation of a user who has logged into the image forming apparatus, jobs including a job which is being executed and a job which is to be executed;
if a first setting is preset, resuming, based on detection of logout of the user in a state that the jobs are suspended, a job instructed to be executed by another user from among the suspended jobs wherein another job instructed to be executed by the user is kept suspended; and
if a second setting is preset, resuming, based on detection of logout of the user in the state that the jobs are suspended, the job instructed to be executed by another user and the another job instructed to be executed by the user.

7. The method according to claim 6, wherein the job instructed to be executed by the another user is performed prior to the another job instructed to be executed by the user.

8. The method according to claim 6, wherein the another job instructed to be executed by the user is kept suspended in an error state.

9. The method according to claim 6, further comprising setting one of the first setting and the second setting.

10. The method according to claim 6, wherein the jobs include a copy job.

11. A non-transitory storage medium storing a program for causing a computer to execute a control method for an image forming apparatus including an operation unit, the method comprising:
suspending, based on operation of a user who has logged into the image forming apparatus, jobs including a job which is being executed and a job which is to be executed;
if a first setting is preset, resuming, based on detection of logout of the user in a state that the jobs are suspended, a job instructed to be executed by another user from among the suspended jobs wherein another job instructed to be executed by the user is kept suspended; and
if a second setting is preset, resuming, based on detection of logout of the user in the state that the jobs are suspended, the job instructed to be executed by another user and the another job instructed to be executed by the user.

12. The non-transitory storage medium according to claim 11, wherein the job instructed to be executed by the another user is performed prior to the another job instructed to be executed by the user.

13. The non-transitory storage medium according to claim 11, wherein the another job instructed to be executed by the user is kept suspended in an error state.

14. The non-transitory storage medium according to claim 11, further comprising setting one of the first setting and the second setting.

15. The non-transitory storage medium according to claim 11, wherein the jobs include a copy job.

* * * * *